United States Patent
Zou et al.

(10) Patent No.: US 11,048,953 B2
(45) Date of Patent: Jun. 29, 2021

(54) SYSTEMS AND METHODS FOR FACIAL LIVENESS DETECTION

(71) Applicant: QUALCOMM Incorporated, San Diego, CA (US)

(72) Inventors: Xuan Zou, Shanghai (CN); Ke-li Cheng, San Diego, CA (US); Michel Adib Sarkis, San Diego, CA (US); Matthew Fischler, San Diego, CA (US); Ning Bi, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/641,469

(22) PCT Filed: Dec. 1, 2017

(86) PCT No.: PCT/CN2017/114256
§ 371 (c)(1),
(2) Date: Feb. 24, 2020

(87) PCT Pub. No.: WO2019/056579
PCT Pub. Date: Mar. 28, 2019

(65) Prior Publication Data
US 2021/0049391 A1 Feb. 18, 2021

Related U.S. Application Data

(63) Continuation of application No. PCT/CN2017/102981, filed on Sep. 22, 2017.

(30) Foreign Application Priority Data

Sep. 22, 2017 (WO) ................ PCT/CN2017/102981

(51) Int. Cl.
*G06K 9/00* (2006.01)
*G06T 7/62* (2017.01)
(Continued)

(52) U.S. Cl.
CPC ..... *G06K 9/00906* (2013.01); *G06K 9/00281* (2013.01); *G06K 9/6201* (2013.01);
(Continued)

(58) Field of Classification Search
CPC .......... G06K 9/00906; G06K 9/00281; G06K 9/6201; G06K 9/4609; G06T 7/62; G06T 7/50; G06T 7/40; G06T 2207/30201
See application file for complete search history.

(56) References Cited

U.S. PATENT DOCUMENTS

2013/0188840 A1   7/2013 Ma et al.
2016/0140390 A1*  5/2016 Ghosh ................ G06K 9/00617
                                                        348/78

(Continued)

FOREIGN PATENT DOCUMENTS

CN   103514440 A   1/2014
CN   106295496 A   1/2017

OTHER PUBLICATIONS

International Search Report and Written Opinion—PCT/CN2017/114256—ISA/EPO—dated Jun. 1, 2018.
(Continued)

*Primary Examiner* — Dhaval V Patel
(74) *Attorney, Agent, or Firm* — QUALCOMM Incorporated

(57) ABSTRACT

A method performed by an electronic device is described. The method includes receiving an image. The image depicts a face. The method also includes detecting at least one facial landmark of the face in the image. The method further includes receiving a depth image of the face and determining
(Continued)

at least one landmark depth by mapping the at least one facial landmark to the depth image. The method also includes determining a plurality of scales of depth image pixels based on the at least one landmark depth and determining a scale smoothness measure for each of the plurality of scales of depth image pixels. The method additionally includes determining facial liveness based on at least two of the scale smoothness measures. Determining the facial liveness may be based on a depth-adaptive smoothness threshold and/or may be based on a natural face size criterion.

30 Claims, 12 Drawing Sheets

(51) Int. Cl.
*G06T 7/50* (2017.01)
*G06K 9/62* (2006.01)
*G06T 7/40* (2017.01)

(52) U.S. Cl.
CPC .......... *G06T 7/40* (2013.01); *G06T 7/50* (2017.01); *G06T 7/62* (2017.01); *G06T 2207/30201* (2013.01)

(56) References Cited

U.S. PATENT DOCUMENTS

2016/0335483 A1* 11/2016 Pfursich ............. G06K 9/00899
2016/0379041 A1    12/2016 Rhee et al.
2017/0154461 A1*  6/2017 Rhee ..................... G06T 17/00

OTHER PUBLICATIONS

International Search Report and Written Opinion—PCT/CN2017/102981—ISA/EPO—dated Feb. 24, 2018.

* cited by examiner

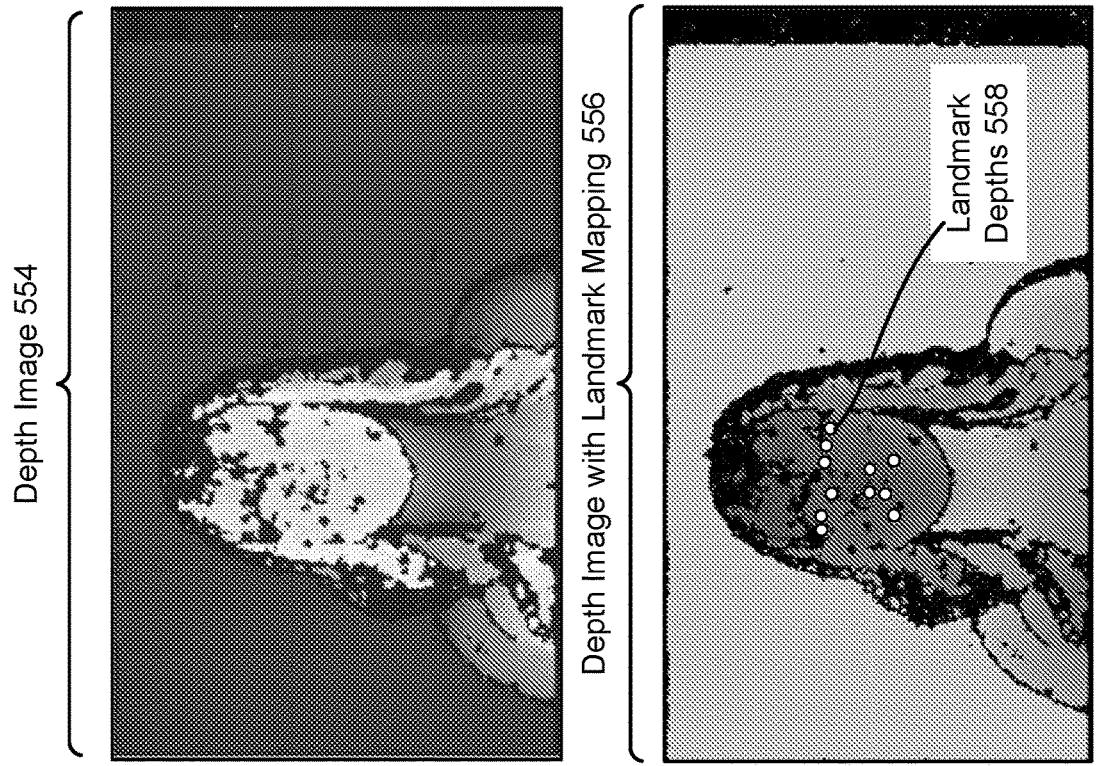
FIG. 5

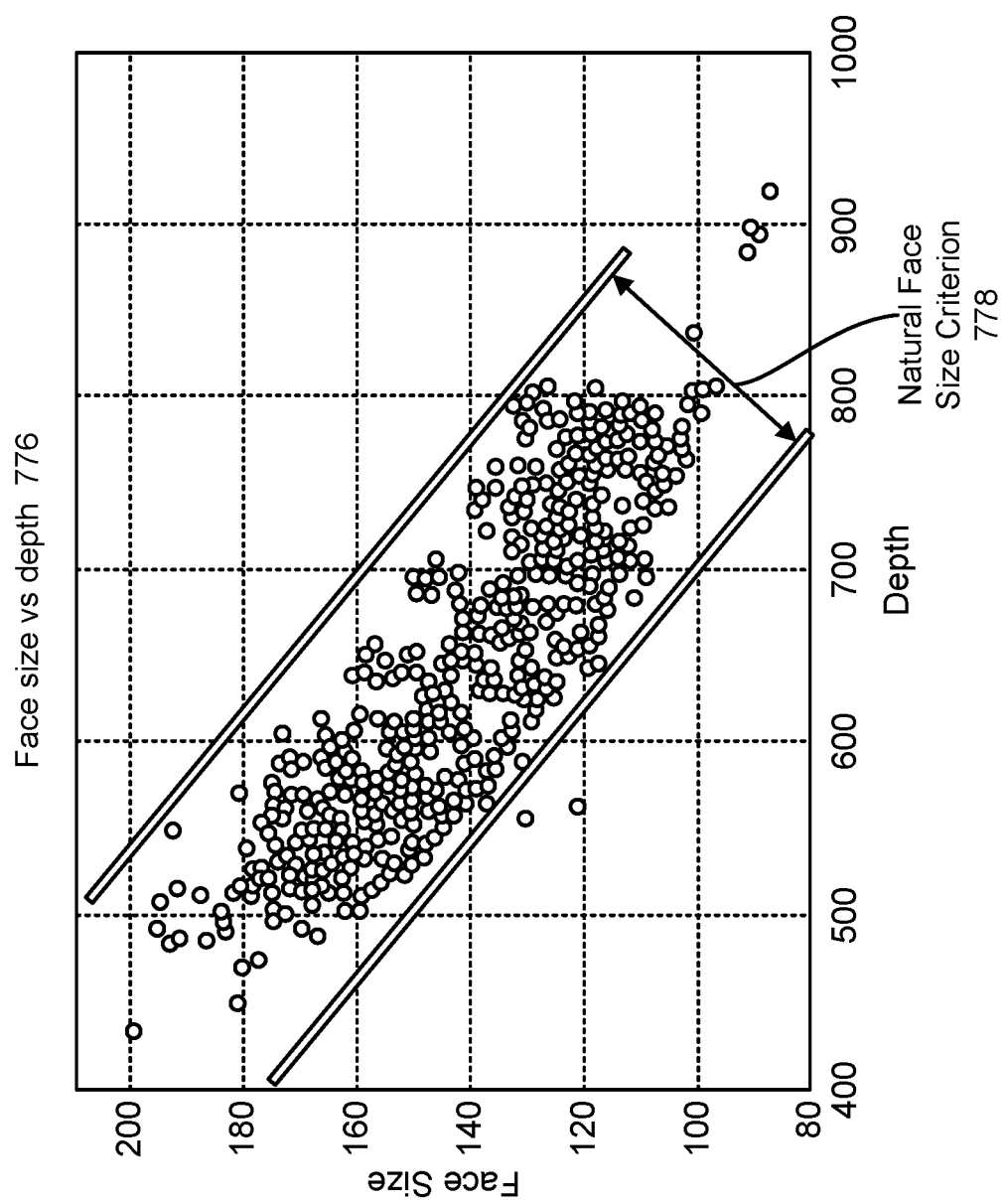
FIG. 7

SYSTEMS AND METHODS FOR FACIAL LIVENESS DETECTION

RELATED APPLICATION

This application is a U.S. national stage application under 35 U.S.C. 371 of International Application No. PCT/CN2017/114256, filed Dec. 1, 2017, for "SYSTEMS AND METHODS FOR FACIAL LIVENESS DETECTION," which is related to and claims priority to International Application No. PCT/CN2017/102981, filed Sep. 22, 2017, for "SYSTEMS AND METHODS FOR FACIAL LIVENESS DETECTION, " both of which are incorporated herein by reference in their entireties.

FIELD OF DISCLOSURE

The present disclosure relates generally to electronic devices. More specifically, the present disclosure relates to systems and methods for facial liveness detection.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smart phone may capture and/or process still and/or video images. Processing images may demand an amount of time, memory, and energy resources. The resources demanded may vary in accordance with the complexity of the processing.

Electronic security may be susceptible to circumvention in some cases. For example, hackers have developed approaches to defeat electronic security measures. As can be observed from this discussion, systems and methods that improve electronic security may be beneficial.

SUMMARY

A method performed by an electronic device is described. The method includes receiving an image. The image depicts a face. The method also includes detecting at least one facial landmark of the face in the image. The method further includes receiving a depth image of the face. The method additionally includes determining at least one landmark depth by mapping the at least one facial landmark to the depth image. The method also includes determining a plurality of scales of depth image pixels based on the at least one landmark depth. The method further includes determining a scale smoothness measure for each of the plurality of scales of depth image pixels. The method additionally includes determining facial liveness based on at least two of the scale smoothness measures. The method may include performing authentication based on the facial liveness determination.

Determining the plurality of scales may be based on an inverse relationship between the at least one landmark depth and the plurality of scales. Determining the scale smoothness measures may include applying Laplacian filtering for each of the plurality of scales of the depth image pixels. Determining the scale smoothness measures may include applying a Laplacian kernel for each of the plurality of scales for each depth pixel within a landmark patch for each of the at least one landmark depth.

The method may include determining a smoothness measure based on at least two of the scale smoothness measures. Determining the facial liveness may include comparing the smoothness measure to a smoothness threshold. The method may include adapting the smoothness threshold based on the at least one landmark depth in accordance with a direct relationship.

The method may include determining whether a size of the face meets a natural face size criterion. Determining whether the size of the face meets the natural face size criterion may include determining whether the size of the face at a depth indicated by the depth image is within a natural face size range. Determining the facial liveness may be further based on the determination of whether the size of the face meets the natural face size criterion.

An electronic device is also described. The electronic device includes a memory. The electronic device also includes a processor coupled to the memory. The processor is configured to receive an image. The image depicts a face. The processor is also configured to detect at least one facial landmark of the face in the image. The processor is further configured to receive a depth image of the face. The processor is additionally configured to determine at least one landmark depth by mapping the at least one facial landmark to the depth image. The processor is also configured to determine a plurality of scales of depth image pixels based on the at least one landmark depth. The processor is further configured to determine a scale smoothness measure for each of the plurality of scales of depth image pixels. The processor is additionally configured to determine facial liveness based on at least two of the scale smoothness measures.

A non-transitory tangible computer-readable medium storing computer executable code is also described. The computer-readable medium includes code for causing an electronic device to receive an image. The image depicts a face. The computer-readable medium also includes code for causing the electronic device to detect at least one facial landmark of the face in the image. The computer-readable medium further includes code for causing the electronic device to receive a depth image of the face. The computer-readable medium additionally includes code for causing the electronic device to determine at least one landmark depth by mapping the at least one facial landmark to the depth image. The computer-readable medium also includes code for causing the electronic device to determine a plurality of scales of depth image pixels based on the at least one landmark depth. The computer-readable medium further includes code for causing the electronic device to determine a scale smoothness measure for each of the plurality of scales of depth image pixels. The computer-readable medium additionally includes code for causing the electronic device to determine facial liveness based on at least two of the scale smoothness measures.

An apparatus is also described. The apparatus includes means for receiving an image. The image depicts a face. The apparatus also includes means for detecting at least one facial landmark of the face in the image. The apparatus further includes means for receiving a depth image of the face. The apparatus additionally includes means for determining at least one landmark depth by mapping the at least one facial landmark to the depth image. The apparatus also includes means for determining a plurality of scales of depth image pixels based on the at least one landmark depth. The apparatus further includes means for determining a scale smoothness measure for each of the plurality of scales of depth image pixels. The apparatus additionally includes means for determining facial liveness based on at least two of the scale smoothness measures.

BRIEF DESCRIPTION OF THE DRAWINGS

FIG. 5 is a diagram illustrating examples of an image, an image with landmark detection, a depth image, and a depth image with landmark mapping;

FIG. 7 is a diagram illustrating an example of face size determination and a natural face size criterion;

DETAILED DESCRIPTION

Figure 1:
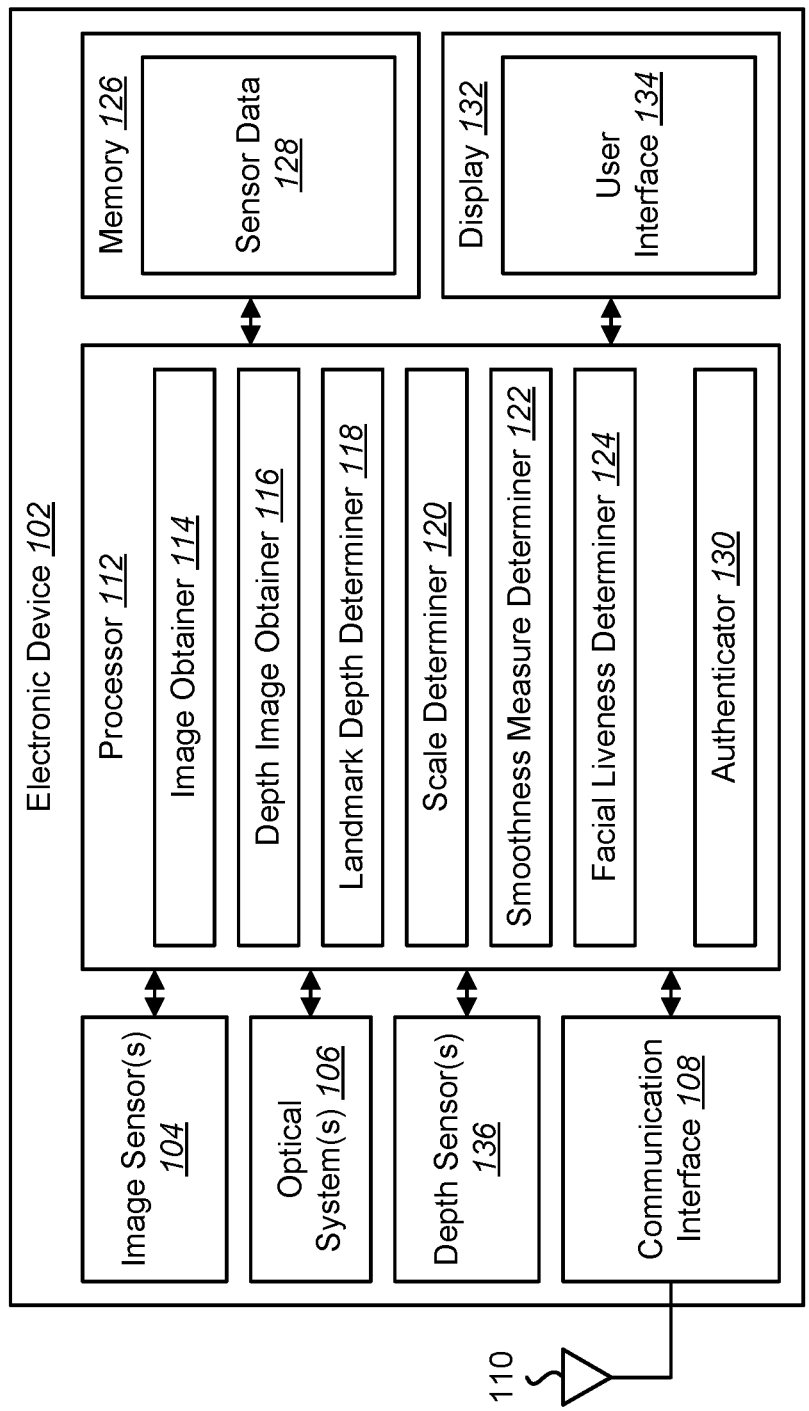
FIG. 1 is a block diagram illustrating one example of an electronic device in which systems and methods for facial liveness detection may be implemented.

The systems and methods disclosed herein may relate to facial liveness detection. For example, some configurations of the systems and methods disclosed herein may relate to robust face liveness detection based on image information (e.g., color image information) and/or depth information. Some configurations may be utilized for detection and/or recognition of a user's face. For instance, some configurations may be implemented for phone unlocking based on face authentication and/or online payment based on face authentication.

In some approaches, face recognition technology may be used for user authentication for privacy/security related phone applications, entrance control in a building, etc. During the authentication process, a probe face image/video of a subject may be captured and compared against one or more stored templates of the user (e.g., claimed subject). If the similarity between the probe face and the stored templates is large enough, then the authentication may be successful.

Face authentication systems may be attacked by presenting artificial faces (e.g., forged faces, printed faces, and/or recorded face videos, etc.) of an authorized person (e.g., the eligible subject) to the camera of the face authentication systems. Some face authentication systems can be easily fooled (e.g., spoofed) by showing an image of an eligible user's face to the camera. For example, the image may be printed on a paper or presented on a display device. Some configurations of the systems and methods disclosed herein may detect facial liveness using a combination of image (e.g., color image) and depth information. Spoofing may refer to techniques for defeating one or more security measures (e.g., authentication). For example, spoofing may utilize a substitute or counterfeit representation (e.g., a video shown on tablet or phone, a photograph, etc.) of a person in order to defeat an authentication procedure. For instance, authentication using facial recognition may be spoofed with photographs, tablets, or smart phones (showing a person's photo or video).

As face authentication systems are deployed, the technology to distinguish physical faces of the eligible subjects from artificial (e.g., forged) faces may become more and more important. Such technology may include liveness detection and/or anti-spoofing. Pure image/video analysis based methods to deal with 2D face spoofing (attacks by photos/videos) may not be very reliable unless user interaction is also introduced into the authentication procedure. For example, the user may be asked to make live-face specific movements, such as eye blinking, lip movements or head movements. An algorithm may be used to detect those motions from the captured video to verify the liveness. However, this requires users' collaboration and may be inconvenient.

Some techniques for liveness detection may utilize three-dimensional (3D) information for face liveness detection. In some approaches, 3D structure may be recovered from multiple image frames. For example, a 3D face model may be reconstructed using multiple face images from a monocular camera. Some disadvantages of these approaches may include the time needed for 3D reconstruction with multiple frames. Some approaches may perform curvature based face liveness detection by utilizing a commercial 3D scanner to capture a high quality 3D face. The curvature of every pixel in the whole face region may be averaged as a measure for liveness detection. Some disadvantages to these approaches may include needing a high quality 3D scanner and/or high computational cost to calculate curvature for all points in face region. Some of these approaches may provide poorer results in comparison with some configurations of the systems and methods disclosed herein. For example, curvature-based liveness algorithm variants may include an average of curvature over a face region or a landmark neighborhood, with or without ignoring any neighborhood with missing values (e.g., "sanity check"). The curvature-based algorithms performed worse than some configurations of the systems and methods disclosed herein (e.g., local smoothness approaches). The worse performance of curvature approaches may be due to sensor quality (e.g., low-quality depth sensors) with reduced depth resolution and/or with missing data.

One challenge with depth sensing is that the quality of depth information from a consumer-level depth sensor may be low. Some configurations of the systems and methods disclosed herein for robust liveness detection work well with such low-cost depth sensors despite the low quality depth image.

Some configurations of the systems and methods disclosed herein may include one or more of the following aspects. In some approaches, an image (e.g., color image, black-and-white image, two-dimensional (2D) image, etc.) and a depth image may be used together for liveness detection (e.g., both a color image and a depth image from one or more sensors may be used). For instance, some configurations may enable robust face liveness detection based on a red-green-blue-depth (RGB-D) sensor that may work well, even with consumer-level RGB-D sensors.

Fusion of the image (e.g., color image) and depth image may be used achieve robust liveness detection. For example, the image may be used to determine the locations of a face and landmarks, which may be used to locate the landmarks on the depth image through mapping. The image (e.g., color image, black and white image, etc.) and depth image can come from any sensor(s). For example, RGB-D, dual camera, and/or other sensors may be used, where the correspondence between the image and depth image may be available through calibration.

The depth image may be used to calculate a discriminative surface smoothness measure for liveness detection. In some configurations, the smoothness measure may be a distance-adaptive multi-scale local smoothness measure on the depth image that may be used for liveness detection. For example, the surface smoothness measure may be based on Laplacian filtering.

The smoothness measure may be superior to Gaussian curvature-based methods in both computational cost and discriminative power. In particular, local smoothness measures may be calculated sparsely on facial landmarks neighborhoods instead of on global face regions for better efficiency, and may be more robust. In this way, the measure may be less affected by possible missing depth data within the face region. Local smoothness measures on different scales of the depth image may be combined to form a more robust measure. The scales considered in the multi-scale local smoothness may be adaptively determined by the distance between the sensor and the face. The smoothness measure may have much lower computational complexity compared with some curvature approaches, where principal analysis is required for every 3D point in the face surface. Accordingly, one benefit of some configurations is a robust and efficient liveness measure.

In some configurations, a distance adaptive smoothness (e.g., liveness) threshold may be utilized. For example, the range of the smoothness measure (e.g., liveness score) of live faces may vary with the distance between the face and the sensor. The smoothness measure may be compared with the smoothness threshold to determine liveness. For example, a distance-adaptive multi-scale local smoothness measure may be utilized with distance-adaptive liveness thresholding to determine liveness.

In some configurations, distance-adaptive face size validation may be utilized as an additional or alternative criterion for liveness detection. For example, the size of a real face at different distances has a specific range. This constraint may be used to reject a faked face with improper physical size (e.g., a face displayed on the phone screen which has a limited size). Accordingly, distance-adaptive face size validation may be beneficially utilized for liveness detection.

Some configurations of the systems and methods disclosed herein may be implemented in a variety of contexts. For example, some configurations may be implemented in one or more of the following contexts/platforms: mobile, automotive, connected home, wearables, robotics, and/or other contexts/platforms. Some configurations may be implemented for entertainment applications, safety and security applications, and/or health and fitness applications.

Various configurations are now described with reference to the Figures, where like reference numbers may indicate functionally similar elements. The systems and methods generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for facial liveness detection may be implemented. Examples of the electronic device 102 may include cameras, video camcorders, digital cameras, cellular phones, smart phones, computers (e.g., desktop computers, laptop computers, etc.), tablet devices, electronic locks, security systems, media players, televisions, vehicles, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, electro-mechanical devices, etc. The electronic device 102 may include one or more components or elements. One or more of the components or elements may be implemented in hardware (e.g., circuitry), in a combination of hardware and software (e.g., a processor with instructions), and/or in a combination of hardware and firmware.

In some configurations, the electronic device 102 may include one or more processors 112, one or more memories 126, one or more displays 132, one or more image sensors 104, one or more optical systems 106, one or more depth sensors 136, and/or one or more communication interfaces 108. The processor 112 may be coupled to (e.g., in electronic communication with) the memory 126, display 132, image sensor(s) 104, optical system(s) 106, depth sensor(s) 136 and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104, optical system 106, and/or depth sensor 136. Additionally or alternatively, the electronic device 102 may or may not include a display 132. Additionally or alternatively, the electronic device 102 may or may not include a communication interface 108.

The memory 126 may store instructions and/or data. The processor 112 may access (e.g., read from and/or write to) the memory 126. Examples of instructions and/or data that may be stored by the memory 126 may include sensor data 128 (e.g., images, image data, image frames, pixels, video, depth images, depth image data, depths, etc.), landmarks, features, feature points, feature vectors, keypoint data, corner data, image obtainer 114 instructions, depth image obtainer 116 instructions, landmark depth determiner 118 instructions, scale determiner 120 instructions, smoothness measure determiner 122 instructions, facial liveness determiner 124 instructions, authenticator 130 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3D, Long Term Evolution (LTE), CDMA, 5G, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The image sensor(s) 104 may capture one or more images (e.g., color images, black and white images, image data, pixels, video, burst images, still images, etc.). The one or more images (e.g., image frames) may be images of a scene (e.g., one or more objects and/or background). In some configurations, the electronic device 102 (e.g., image obtainer 114) may utilize the image sensor(s) to obtain one or more images.

The optical system(s) 106 (e.g., one or more lenses) may focus images of objects that are located within the field of view of the optical system(s) 106 onto one or more image sensors 104. The optical system(s) 106 may be coupled to and/or controlled by one or more processors (e.g., the processor 112, image signal processor, etc.) in some configurations. For example, focus and/or zoom of the optical system(s) 106 may be controlled.

A camera may include at least one image sensor and at least one optical system. Accordingly, the electronic device 102 may be one or more cameras and/or may include one or more cameras in some implementations. In some implementations, the electronic device 102 may include multiple optical system(s) 106 and/or multiple image sensors 104. Different lenses may each be paired with separate image sensors 104 in some configurations. Additionally or alternatively, two or more lenses may share the same image sensor 104.

The depth sensor(s) 136 may capture one or more depth images (e.g., depth image data, pixels, depths, depth maps, distances between the depth sensor(s) 136 and one or more objects, etc.). Examples of depth sensors 136 may include infrared time-of-flight (TOF) cameras, stereoscopic image sensors, structured light sensors, and/or lidar, etc. In some configurations, one or more image sensors 104 (e.g., visual spectrum sensors) may be utilized as depth sensor(s) 136. The depth sensors(s) 136 may be utilized to measure one or more distances from the depth sensor(s) 136 to one or more objects. In some configurations, a depth image captured by the depth sensor(s) 136 may correspond to an image captured by the image sensor(s) 104. For example, the scene captured by the depth sensor(s) 136 may overlap with the image sensor(s) 104. In some approaches, the image sensor(s) 104 and/or depth sensor(s) 136 may have similar fields of view and/or may be calibrated to capture similar scenes. For example, the electronic device 102 may determine a relationship (e.g., transformation, registration, translation and/or rotation, etc.) between the image(s) from the image sensor(s) 104 and the depth image(s) from the depth sensor(s) 136. The relationship may be indicated with calibration data. In some configurations, the depth sensor(s) 136 may be integrated with the image sensor(s) 104.

The electronic device may include one or more displays 132. The display(s) 132 may present visual information (e.g., one or more images, user interfaces, video, still images, graphics, virtual environments, three-dimensional (3D) image content, symbols, characters, etc.). The display(s) 132 may be implemented with one or more display technologies (e.g., liquid crystal display (LCD), organic light-emitting diode (OLED), plasma, cathode ray tube (CRT), etc.). The display(s) 132 may be integrated into the electronic device 102 or may be coupled to the electronic device 102. In some configurations, all or portions of the images that are being captured by the image sensor(s) 104 may be presented on the display 132. Additionally or alternatively, one or more representative images (e.g., icons, cursors, virtual reality images, augmented reality images, etc.) may be presented on the display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., image(s), video, etc.) may be presented on the display 132 and/or user interface 134.

In some configurations, the electronic device 102 may include a camera software application. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames, one or more still images, and/or one or more burst frames, etc. It should be noted that some configurations of the systems and methods disclosed herein may utilize a series of image frames (e.g., video).

The processor 112 may include and/or implement an image obtainer 114, a depth image obtainer 116, a landmark depth determiner 118, a scale determiner 120, a smoothness measure determiner 122, a facial liveness determiner 124, and/or an authenticator 130. It should be noted that one or more of the elements illustrated in the electronic device 102 and/or processor 112 may be optional. For example, the image obtainer 114, the depth image obtainer 116, the landmark depth determiner 118, and/or the authenticator 130 may or may not be included and/or implemented in some configurations. Other variations may be implemented.

In some configurations, one or more of the elements illustrated in the processor 112 may be implemented separately from the processor 112 (e.g., in other circuitry, on another processor, on a separate electronic device, etc.). For example, the image obtainer 114, the depth image obtainer 116, the landmark depth determiner 118, the scale determiner 120, the smoothness measure determiner 122, the facial liveness determiner 124, and/or the authenticator 130 may be implemented on a secure processor. In some configurations, one or more of the image obtainer 114, the depth image obtainer 116, the landmark depth determiner 118, the scale determiner 120, the smoothness measure determiner 122, the facial liveness determiner 124, and/or the authenticator 130 may be implemented on multiple processors and/or a combination of processors. In some configurations, the processor 112 may be a secure processor.

The processor 112 may include and/or implement an image obtainer 114. One or more images (e.g., image frames, video, burst shots, etc.) may be provided to the image obtainer 114. For example, the image obtainer 114 may obtain (e.g., receive) image frames from one or more image sensors 104. For instance, the image obtainer 114 may receive image data from one or more image sensors 104 and/or from one or more external cameras. In particular, the image(s) may be captured from the image sensor(s) 104 included in the electronic device 102 and/or may be captured from one or more remote cameras.

In some configurations, the image obtainer 114 may request and/or receive the one or more images. For example, the image obtainer 114 may request and/or receive one or more images from a remote device (e.g., one or more external image sensors coupled to the electronic device 102, a network server, drop camera, automobile camera, action camera, web camera, smart phone camera, etc.). In some configurations, the electronic device 102 (e.g., image obtainer 114) may request and/or receive the one or more images via the communication interface 108. For example, the electronic device 102 may or may not include a camera (e.g., an image sensor 104 and/or optical system 106) and may receive images from one or more remote devices.

The one or more images may depict (e.g., include) one or more faces. Each of the face(s) may represent a live face (e.g., the actual physical face of a person in the field of view of the camera that captured the image) or an artificial face (e.g., a photograph of a face, a video of a face, etc.). For example, a live face may correspond to an initial capture of the actual face in the field of view of the camera, whereas an artificial face may not be an initial capture of the actual face. For instance, an artificial face may be a non-initial capture (e.g., an image of an image of the face) or some other non-actual representation of a face. One or more of the faces may be utilized by the electronic device 102 for performing facial liveness detection, facial recognition, and/or authentication.

The processor 112 may include and/or implement a depth image obtainer 116. One or more depth images (e.g., depths, distances, depth pixels, etc.) may be provided to the depth image obtainer 116. For example, the depth image obtainer 116 may obtain (e.g., receive) depth images from one or more depth sensors 136. For instance, the depth image obtainer 116 may receive depth image data from one or more depth sensors 136 and/or from one or more external depth sensors. In particular, the depth image(s) may be captured from the depth sensor(s) 136 included in the electronic device 102 and/or may be captured from one or more remote depth sensors.

In some configurations, the depth image obtainer 116 may request and/or receive the one or more depth images. For example, the depth image obtainer 116 may request and/or receive one or more depth images from a remote device (e.g., one or more external depth sensors coupled to the electronic device 102, a network server, etc.). In some configurations, the electronic device 102 (e.g., depth image obtainer 116) may request and/or receive the one or more depth images via the communication interface 108. For example, the electronic device 102 may or may not include a depth sensor 136 and may receive depth images from one or more remote devices. The one or more depth images may include depth data of one or more faces. One or more of the faces may correspond to one or more of the faces depicted in the image (e.g., color image, black and white image, etc.).

The processor 112 may include and/or implement a landmark depth determiner 118. The landmark depth determiner 118 may perform facial landmark localization in the depth image. For example, the landmark depth determiner 118 may determine one or more depths in the depth image(s) corresponding to one or more landmarks in the image(s). In some approaches, one or more landmarks (e.g., keypoints, feature points, etc.) may correspond to one or more locations of the one or more faces depicted in the image(s). For example, a calibration procedure can be applied to the depth image and color image (captured by a RGB-D sensor, for instance). For any location(s) in the image(s) (e.g., color image(s)), the corresponding location(s) on the depth image may be obtained using the calibration information.

In some configurations, the processor 112 (e.g., landmark depth determiner 118) may determine the one or more landmarks in the image(s). For example, the processor 112 may search the image(s) for particular landmarks of a face (e.g., mouth corners, lip corners, nose corners, eye corners, irises, and/or eyebrow corners, etc.). In some approaches, facial landmarks may be initially detected on the image (e.g., color image) by a face detector.

In some configurations, corresponding locations of the facial landmarks on depth images may be calculated through a mapping. For example, the landmark depth determiner 118 may determine the one or more landmark depths by mapping one or more facial landmarks in the image(s) to the depth image. For instance, the landmark depth determiner 118 may determine one or more corresponding points (e.g., depth pixels, depths, distances, etc.) in the depth image corresponding to the landmarks in the image(s). In some approaches, this may be accomplished by transforming the landmarks in the image(s) to corresponding points (e.g., depth pixels) in the depth image(s) based on calibration data. For example, the landmark depth determiner 118 may transform (e.g., translate and/or rotate) the landmarks (e.g., pixels locations of the landmarks, pixel grid locations, etc.) to points (e.g., depth pixel grid locations) in the depth image(s). The depths at the corresponding points may be the landmark depths (e.g., the depths of the face corresponding to facial landmarks). It should be noted that that since one or more depth values on the depth image may be incorrect or missing due to a low quality sensor (e.g., RGB-D sensor) in some configurations, a corresponding location on the depth image for every facial landmark detected in the image (e.g., color image) may not be found in some cases.

The processor 112 may include and/or implement a scale determiner 120. The scale determiner 120 may determine (e.g., adapt) one or more scales (e.g., a plurality of scales) of depth image pixels based on the one or more landmark depths. A scale may refer to a spacing of depth pixels relative to a landmark depth. For example, a scale may be referred to as a distance (e.g., radius) from the landmark depth. A scale may indicate a set of depth image pixels relative to the landmark depth. In some approaches, the set of depth image pixels may be determined in one or more directions relative to the landmark depth. For example, a set of depth image pixels (at one scale, for instance) may include one depth image pixel above the landmark depth, one depth image pixel below the landmark depth, one depth image pixel to the left of the landmark depth, and one depth image pixel to the right of the landmark depth. In one specific example, a set of depth image pixels at a scale of 2 (e.g., radius of 2) may be spaced two depth image pixels from the landmark depth (e.g., pixels that are 2 pixels away from the landmark depth in left, right, up, and down directions). It should be noted that one or more additional or alternative directions may be utilized. For example, one or more pixels along diagonal directions may additionally or alternatively be utilized.

The scale determiner 120 may determine the one or more scales based on the landmark depth (for each landmark depth, for example). In some configurations, the scales size may be inversely related to the landmark depth. For instance, smaller depths may correspond to larger scales and larger depths may correspond to smaller scales. This may be due to the relationship between object size and depth (e.g., an object may appear larger when closer to a sensor or smaller when farther from a sensor). For example, the one or more scales may be adapted to be smaller when a face is at a greater depth (e.g., farther away) and/or may be adapted to be larger when a face is at a lesser depth (e.g., closer). Accordingly, the scales may span fewer pixels when the face is farther away.

In some configurations, the scale determiner 120 may determine a set of scales (e.g., plurality of scales) for one or more landmark depths (e.g., corresponding to each landmark). For example, a nostril landmark at a shallow depth (e.g., small distance) may have scales (e.g., radii) of 3, 6, and 9, whereas a nostril landmark at a deep depth (e.g., large distance) may have scales of 1, 2, and 3.

In some configurations, the scale determiner 120 may determine one or more scales (e.g., set of scales, plurality of scales, scale set, etc.) based on a global landmark depth (e.g., a sum or average depth of all landmark depths). The set of scales (based on the global landmark depth, for example) may be used for the smoothness measure determination (e.g., calculation) for every landmark (e.g., all landmarks and/or each landmark, etc.). Accordingly, the same scale or set of scales may be used for each landmark for the smoothness measure determination in some approaches. It should be noted that different sets of scales may be applied to different landmarks based on their individual depth in some approaches. In some approaches, combining local smoothness measures obtained at a set of different scales may lead to more accurate results than at a single scale only.

In some configurations, the scale determiner 120 may utilize a function and/or a look-up table to determine (e.g., obtain) the set of scales for a given depth. For example, the function and/or look-up table may map a landmark depth (e.g., an individual or global landmark depth) to one or more scales. For instance, one or more landmark depth ranges (e.g., average landmark depth ranges) may correspond to one or more scales. In some approaches, the look-up table may be built empirically (e.g., each scale may be determined empirically from experimentation). For example, the range of depth (e.g., landmark depth) considered may be quantized into multiple subbands. For each subband, the corresponding maximum scale and minimal scale may be determined empirically and stored in the look-up table. The look-up table may be predetermined in some approaches.

The scale determiner 120 may select one or more sets of depth image pixels corresponding to the one or more scales of one or more landmarks. For example, each landmark depth may have an associated set of depth image pixels at multiple scales. The depth image pixels may be utilized to determine a smoothness measure. For example, the scale determiner 120 may provide and/or indicate the sets of depth image pixels to the smoothness measure determiner 122.

The processor 112 may include and/or implement a smoothness measure determiner 122. The smoothness measure determiner 122 may determine a smoothness measure based on the scales of the depth image pixels. For example, the smoothness measure determiner 122 may utilize the depth image pixel(s) at the scale(s) to calculate a smoothness measure. The smoothness measure may indicate a degree of smoothness of the depth image pixels. For example, depth image pixels that lie on a planar surface or a uniformly curved surface (e.g., flat or flexed image) may tend to yield higher smoothness measures, whereas depth image pixels on non-uniform surfaces (e.g., actual faces) may tend to yield lower smoothness measures.

In some configurations, the smoothness measure determiner 122 may determine the smoothness measure by applying Laplacian filtering to the scale(s) of the depth image pixel(s). For example, Laplacian filtering may be applied to the sets of depth image pixels at the plurality of scales for the landmark(s). Multi-scale Laplacian filtering may result in a smoothness measure on sparse (e.g., spaced) landmark location regions. In some approaches, Laplacian filtering may be performed on multiple sets of depth image pixels corresponding to multiple facial landmarks. The multiple landmark smoothness measures may be combined to obtain the smoothness measure (e.g., overall smoothness measure, final smoothness measure, etc.). In some implementations (to improve robustness, for example), the multi-scale Laplacian smoothness may be determined (e.g., calculated) not only for every landmark, but may also be determined for every pixel (e.g., depth pixel) within a patch (e.g., predefined patch) of each landmark, then combined (e.g., summed and/or averaged, etc.). For example, each landmark (e.g., landmark depth) may have an associated patch (of a fixed size, for instance) that is centered on the landmark. Multi-scale Laplacian smoothness may be determined at one or more scales for each depth pixel within the patch (e.g., for each depth pixel with a value, for each non-missing depth pixel, etc.).

In some configurations, the smoothness measure determiner 122 may determine a distance-adaptive multi-scale local smoothness (MSLS) measure as follows. A Laplacian filtering response at each pixel of an image is the sum of the second derivatives of the image at the current pixel. When applied to a depth image, the filtering response may be a measure of the surface smoothness. In some approaches, Laplacian filtering may be implemented as the sum of difference over the neighbors of the current pixel. An example of a Laplacian filtering kernel (e.g., $L(x, y)$) is given in Equation (1).

$$L(x, y) = \begin{bmatrix} 0 & 1 & 0 \\ 1 & -4 & 1 \\ 0 & 1 & 0 \end{bmatrix} \quad (1)$$

In Equation (1), x and y denote horizontal and vertical components (e.g., indices) of the Laplacian kernel (and/or pixel location), respectively. For example, $L(x, y)$ represents a function of horizontal and vertical variables. While Equation (1) is given as an example of a Laplacian filtering kernel that may be utilized in accordance with some configurations of the systems and methods disclosed herein, one or more different Laplacian filtering kernels may be utilized in accordance with some configurations of systems and methods disclosed herein.

The filtered image $LD(x, y)$ of a depth image $D(x, y)$ can be represented in accordance with Equation (2).

$$LD(x, y) = conv(D(x, y), L(x, y)) \quad (2)$$

In Equation (2), cow( )denotes a convolution function.

The filtered image at any pixel location $(x_0, y_0)$ may be given in accordance with Equation (3).

$$LD(x_0, y_0) = \Sigma_{i=-1}^{1} \Sigma_{j=-1}^{1} L(i,j) D(x_0+i, y_0+j) \qquad (3)$$

The response of scaled Laplacian filtering of a specific scale r may be given in accordance with Equation (4).

$$LD_r(x_0, y_0) = \Sigma_{i=-1}^{1} \Sigma_{j=-1}^{1} L(i,j) D(x_0+r^*i, y_0+r^*j) \qquad (4)$$

For instance, Equation (4) may provide an example of applying a Laplacian kernel to depth image pixels at a scale at a depth pixel location. Examples of pixels involved in scaled Laplacian filtering are given in connection with FIG. 6.

A Laplacian filtering response with different scales on the depth image reflects different levels of surface smoothness for the object surface. Combining (e.g., averaging, summing, etc.) the local smoothness measures obtained at a set of different scales may lead to better results than those at only a single scale.

In a practical system, the face can be at different distances from the sensor. Effective (e.g., discriminative) combinations of scales used in MSLS computation may vary with distances. Accordingly, distance-adaptive MSLS may be utilized, where the scale sets for MSLS may be chosen based on distance (e.g., depth).

For every pixel within a patch with size K by K centered at every located facial landmark on the depth image, the distance-adaptive MSLS may be calculated and averaged as a final smoothness (e.g., liveness) measure. The pixels with missing values (e.g., erroneous values, non-detected depths, etc.) in the depth image may be ignored in the computation. The smoothness (e.g., liveness) measure may be robust to poor depth image quality. For example, the smoothness measure may work well even if some facial landmarks fail to be localized in the depth image.

Preprocessing (e.g., filtering) on a depth image may be helpful to improve the results in some configurations. For example, bilateral filtering and/or guided filtering of the depth image may be utilized. In some implementations, guided filtering may be more efficient in computation and effective for the distance-adaptive MSLS scheme.

The processor 112 may include and/or implement a facial liveness determiner 124. The facial liveness determiner 124 may determine a facial liveness of the face(s) depicted in the image(s). The facial liveness determiner 124 may determine the facial liveness based on one or more techniques or a combination of techniques for determining facial liveness. Examples of techniques for determining facial liveness may include comparing the smoothness measure to a smoothness threshold (e.g., liveness determination threshold) and/or determine whether a size of a face (at a particular depth, for example) is within a natural face size range. The facial liveness determiner 124 may determine facial liveness (e.g., detect spoofing with a non-live or artificial face) based on the smoothness measure and/or face size.

In some configurations, the facial liveness determiner 124 may compare the smoothness measure to a smoothness threshold. The smoothness threshold may be a decision boundary between determining whether the face is live or not. If the smoothness measure is above the smoothness threshold, the facial liveness determiner 124 may determine that the face is an artificial face (e.g., is an image of a face on paper or on a screen, for example). If the smoothness measure is below the smoothness threshold, the facial liveness determiner 124 may determine that the face is a live face (e.g., that the face exhibits depth variations characteristic of a live face).

In some configurations, the processor 112 (e.g., facial liveness determiner 124 or a smoothness threshold determiner) may determine (e.g., adapt) the smoothness threshold based on one or more landmark depths. For example, the processor 112 (e.g., facial liveness determiner 124 or a smoothness threshold determiner) may utilize a function and/or look-up table that maps the landmark depth(s) (e.g., cumulative landmark depth, average landmark depth, global landmark depth, etc.) to a smoothness threshold. In some implementations, a smoothness threshold may be found for a maximum working depth (e.g., 80 centimeters (cm)) for an application, and a smoothness threshold may be found for a minimum working depth (e.g., 30 cm). For example, approximately optimal smoothness thresholds may be found empirically. The smoothness threshold used for a given landmark depth (e.g., average of the landmark depths of the current face) may be obtained by interpolation of the above two smoothness thresholds (for maximum and minimum working depths). The function and/or look-up table may indicate the smoothness threshold value corresponding to the landmark depth (e.g., average landmark depth). For example, different ranges of landmark depths may correspond to different smoothness threshold values.

As described herein, the smoothness threshold may be adaptively determined based on depth. In some approaches, the smoothness threshold may be adapted in a direct relationship to the landmark depth. For example, the smoothness threshold may be higher at greater depths (e.g., higher when the face is farther away) and/or lower at lesser depths (e.g., lower when the face is closer). In some configurations, the electronic device 102 (e.g., processor 112 and/or facial liveness determiner 124, etc.) may increase the smoothness threshold with an increased depth (and/or may decrease the smoothness threshold with a decreased depth). In some approaches, the dependence between the smoothness threshold and the depth (e.g., depth value) may be linear and/or may be normalized by an average depth value. In other approaches, the dependence between the smoothness threshold and the depth (e.g., depth value) may be nonlinear and/or may not be normalized by depth.

In some configurations, the smoothness threshold may be determined (e.g., adapted) based on face size. For example, a look-up table based on face size may be used. For instance, different ranges of face sizes may correspond to different smoothness threshold values. Each smoothness threshold may be determined empirically from experimentation.

In some configurations, the facial liveness determiner 124 may determine facial liveness additionally or alternatively based on face size. For example, the facial liveness determiner 124 may perform face size validation. For instance, one constraint for liveness detection may be the valid range of the face size at a specific distance in some approaches. Since the depth image represents the physical distance between the face and depth sensor(s) (e.g., camera), the range of face size from the image (e.g., color image) may be known through calibration. As described above, landmarks may be successfully and robustly detected from an image (e.g., color image). Accordingly, the face size on the image may be checked. For example, when an image of a face is taken (for spoofing purposes), the resulting image may be out of range of a natural face size in accordance with depth. For instance, a face displayed on a smartphone screen 18 inches away from a device (e.g., image sensor and/or depth sensor) may be much smaller than a natural face at a distance of 18 inches. Accordingly, face size may be used as an additional or alternative approach to determining facial liveness.

In some approaches, the processor 112 (e.g., a face size determiner) may determine a face size. One or more metrics may be utilized to characterize face size. In some approaches, the face size may be measured from the summed distance between several facial landmarks. For example, the processor 112 may determine a quadrilateral corresponding to a face, where the sides of the quadrilateral are between outer eye corner landmarks and outer lip corner landmarks. The perimeter size of the quadrilateral may be one metric representing face size. FIG. 7 shows an example of a face size measure and samples of face size at different distances.

In some configurations, the facial liveness determiner 124 may determine whether the face size meets a natural face size criterion. In some configurations, the natural face size criterion may be determined based on a distribution of face size at different distances, which may be obtained from a training set. In some approaches, the natural face size criterion may be expressed as an upper bound and lower bound of the face size at a specific distance. The two lines illustrated in FIG. 7 provide respective examples of an upper bound and lower bound.

The facial liveness determiner 124 may determine whether the size of the face at a depth indicated by the depth image is within a natural face size range. If the face size does not meet the natural face size criterion, the facial liveness determiner 124 may determine that the face is an artificial face. For example, if the face size is not within the valid range, the face liveness detection is failed. If the face size meets the natural face size criterion, the facial liveness determiner 124 may determine that the face is a live face and/or may use the determination in combination with the smoothness measure determination to decide whether the face is a live face or an artificial face.

In some configurations, the processor 112 may optionally include and/or implement an authenticator 130. The authenticator 130 may perform authentication for one or more subjects (e.g., users). In some configurations, the authenticator 130 may perform facial recognition based on the image(s) and/or depth image(s). For example, the authenticator 130 may compare one or more faces (e.g., landmark structure, feature vectors, facial characteristics, etc.) in the image(s) and/or depth image(s) to authorized face information (e.g., landmark structure, feature vectors, facial characteristics, etc., of one or more authorized faces). In other configurations, facial recognition may be performed by a separate element implemented in the processor 112 or in a separate chip. The authorized face information may be predetermined and/or stored in the memory 126. For example, the electronic device 102 may perform one or more facial authentication setup procedures where the electronic device 102 obtains (e.g., captures, receives, etc.) the authorized face information.

In some approaches, the authenticator 130 may perform authentication based on the facial liveness determination. For example, in a case that the facial liveness determination indicates that the face is an artificial face, the authenticator 130 may deny authentication and/or authentication may fail. In a case that the facial liveness determination indicates a live face, the authenticator 130 may determine whether the live face matches the face of an authorized user. For instance, if a face in the image(s) and/or depth image(s) is recognized as being an authorized subject and it is determined that the face is a live face, the authenticator 130 may verify authentication. Otherwise, the authenticator 130 may deny authentication.

In some configurations of the systems and methods disclosed herein, authentication may be performed on a discrete basis and/or on a continuous basis. For example, the electronic device 102 may continually capture images while the electronic device 102 is in use. This may enable authentication procedures to be performed repeatedly and/or continuously. For example, a device may be configured to continuously perform authentication. If a threshold time period passes without authentication being verified, access may be denied.

Some configurations of the systems and methods disclosed herein may offer passive authentication. For example, a subject (e.g., user) may not need to perform affirmative steps (e.g., pushing a button, making a gesture, providing a command, etc.) for performing authentication (besides using a device and/or entering a device's field of view for example). In other approaches, active authentication may be performed. For example, a user may trigger authentication procedures (by pushing a button, making a gesture, tapping a touch screen, saying a command, etc., for instance).

Verifying or denying authentication may be utilized in many different contexts. For example, the authentication described herein may grant access (e.g., unlock a smart phone, perform a profile login, unlock a door to a secure building/area, allow access to confidential information, allow access to a vehicle, enable autonomous driving, etc.) in a case that authentication is verified. In a case that authentication is denied, the authentication described herein may deny access (e.g., not unlock a smart phone, deny a profile login, maintain a door lock to a secure building/area, deny access to confidential information, deny access to a vehicle, disable autonomous driving, etc.).

It should be noted that one or more functions and/or elements described in connection with FIG. 1 may be distributed among different devices in some configurations. For example, a first electronic device may obtain an image, obtain a depth image, and/or determine landmark depths, which may be provided to a second electronic device. The second electronic device may determine the scale(s), the smoothness measure, and/or facial liveness based on the received information. Accordingly, the electronic device 102 may include all or a subset of the elements described and/or may perform all or a subset of the functions described. Other arrangements may be implemented in accordance with the systems and methods disclosed herein.

It should be noted that one or more of the elements or components of the electronic device 102 may be combined and/or divided. For example, one or more of the image obtainer 114, the depth image obtainer 116, the landmark depth determiner 118, the scale determiner 120, the smoothness measure determiner 122, the facial liveness determiner 124, and/or the authenticator 130 may be combined. Additionally or alternatively, one or more of the image obtainer 114, the depth image obtainer 116, the landmark depth determiner 118, the scale determiner 120, the smoothness measure determiner 122, the facial liveness determiner 124, and/or the authenticator 130 may be divided into elements or components that perform a subset of the operations thereof.

Figure 2:
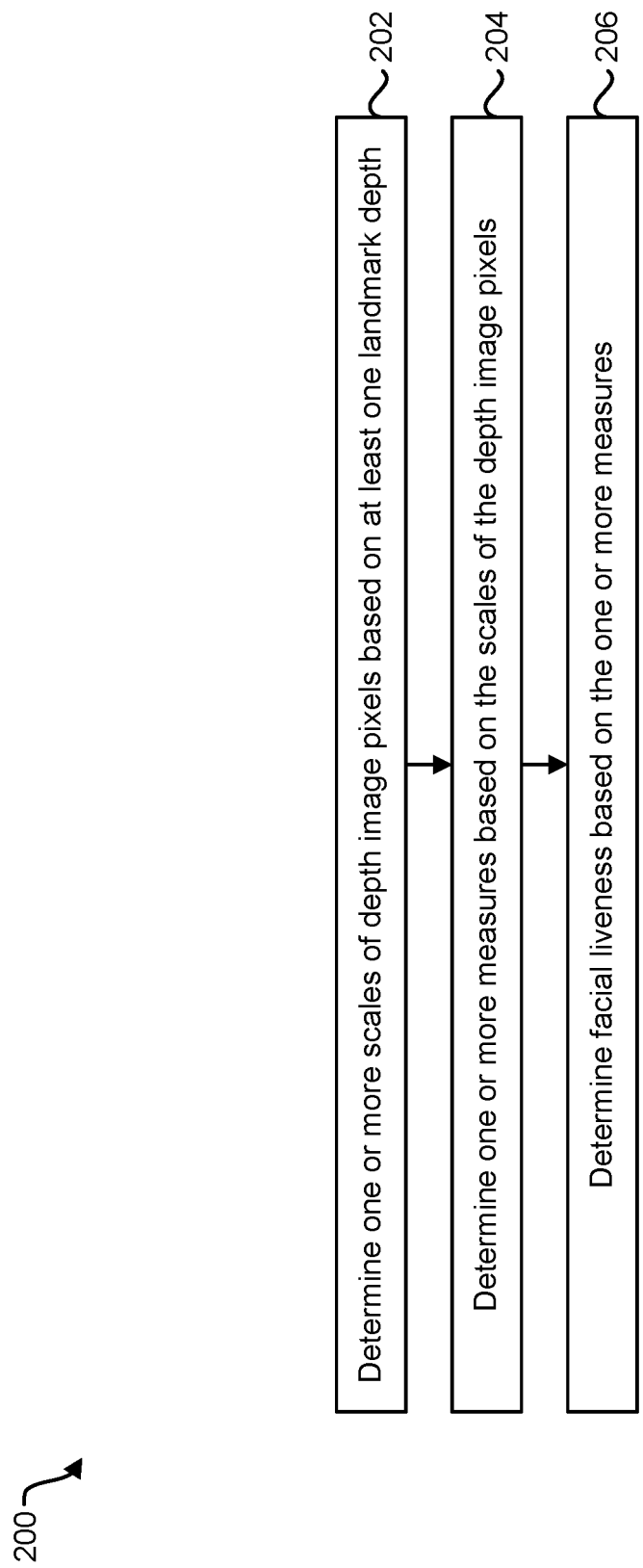
FIG. 2 is a flow diagram illustrating one configuration of a method for facial liveness detection.

FIG. 2 is a flow diagram illustrating one configuration of a method 200 for facial liveness detection. The method 200 may be performed by the electronic device 102 described in connection with FIG. 1, for example. The electronic device 102 may determine 202 one or more scales (e.g., a plurality of scales) based on at least one landmark depth. This may be accomplished as described in connection with FIG. 1. For example, the electronic device 102 may determine a set of scales (e.g., scale sizes) based on landmark depth (e.g., based on whether the face is nearby or farther away).

The electronic device 102 may determine 204 one or more measures based on the scale(s) of the depth image pixels. This may be accomplished as described in connection with FIG. 1. For example, the electronic device 102 may apply Laplacian filtering to sets of depth pixels indicated by the scales to produce a smoothness measure. In some approaches, the electronic device 102 may determine a set of scale smoothness measures, depth pixel smoothness measures, and/or patch smoothness measures to determine the smoothness measure. For example, the electronic device 102 may determine a scale smoothness measure for each scale at each depth pixel in a patch. The scale smoothness measures may be combined to produce a depth pixel smoothness measure for each depth pixel. The depth pixel smoothness measures may be combined to produce a patch smoothness measure. A patch smoothness measure may be determined for each patch (e.g., landmark). The patch smoothness measures may be combined to produce the smoothness measure (e.g., overall smoothness measure, final smoothness measure, etc.).

The electronic device 102 may determine 204 facial liveness based on the one or more measures (e.g., smoothness measure, scale smoothness measure(s), depth pixel smoothness measure(s), and/or patch smoothness measure(s), etc.). This may be accomplished as described in connection with FIG. 1. For example, the electronic device 102 may compare the smoothness measure to a smoothness threshold. A smoothness measure below the smoothness threshold may indicate a live face, whereas a smoothness measure above the smoothness threshold may indicate an artificial face (e.g., a spoofing attempt). In some configurations, the liveness determination may additionally or alternatively be based on face size. For example, if a face size meets a natural face size criterion and the smoothness measure is below the smoothness threshold, the electronic device 102 may determine that the face is a live face. Otherwise, the electronic device 102 may determine that the face is an artificial face.

In some configurations, the electronic device 102 may optionally authenticate based on the facial liveness. This may be accomplished as described in connection with FIG. 1. For instance, the electronic device 102 verify authentication for a recognized authorized face that is also determined to be a live face. If the face is not recognized or is not determined to be a live face, the electronic device 102 may deny authentication.

It should be noted that some configurations of the systems and methods disclosed herein may provide single frame based liveness detection (e.g., liveness detection based on a single image with a corresponding depth image). Additionally or alternatively, some configurations may provide a robust face liveness detection approach for an RGB-D sensor. As described herein, a smoothness (e.g., liveness) measure may be obtained from an image (e.g., color image) and a corresponding depth image. In video based applications, since multiple image frames may be available, the depth image quality may be further improved by depth image fusion in some configurations of the systems and methods disclosed herein. Additionally or alternatively, the liveness detection results may be further improved by fusion of the results from multiple previous frames.

Figure 3:
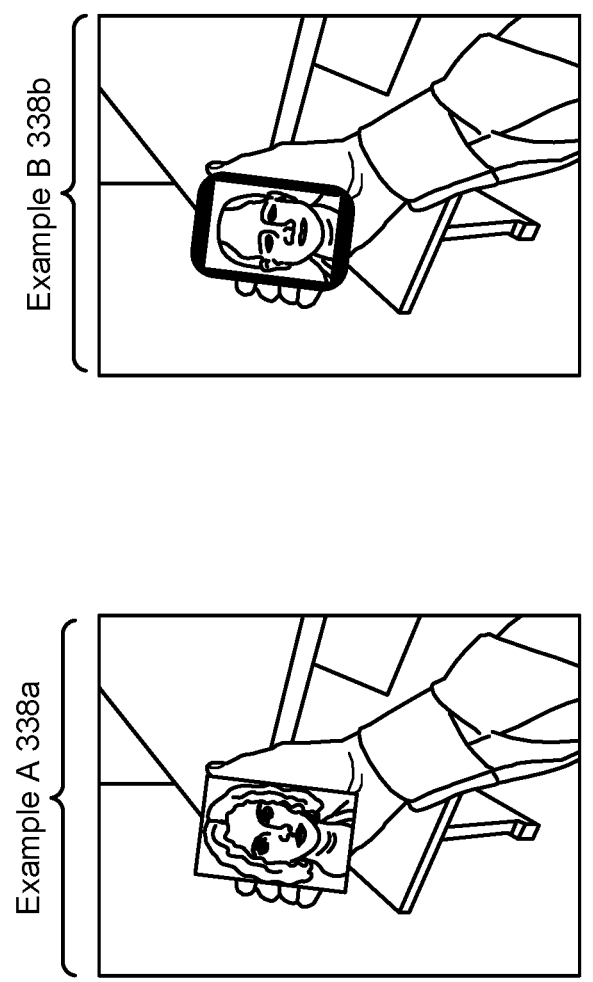
FIG. 3 is a diagram illustrating examples of artificial faces.

FIG. 3 is a diagram illustrating examples 338a-b of artificial faces. Some configurations of the systems and methods disclosed herein may perform face liveness detection. For example, some configurations may distinguish an artificial face (e.g., screen, printed image, etc.) from a live face. In particular, FIG. 3 illustrates examples 338a-b of image and/or video-based 2D attacks to spoof a face recognition system. Some face recognition systems may be fooled by a printed face.

In FIG. 3, the examples 338a-b show images that may be used in spoofing attacks to log in to mobile devices. Specifically, example A 338a shows a printed photo. Example B 338b shows a screenshot. Other examples may include mimic masks and a video replay containing eye blinking. An unauthorized user may attempt to use one or more of the examples 338a-b to defeat authentication measures. Some approaches that use 2D image and/or video based liveness detection may not be reliable.

Some configurations of the systems and methods disclosed herein may utilize one or more sensors to provide three-dimensional (3D) information for robust liveness detection. For example, a red-green-blue-depth (RGB-D) sensor may be implemented in an electronic device (e.g., the electronic device 102 described in connection with FIG. 1). In some implementations, the RGB-D sensor may be an example of an integrated image and depth sensor as described in connection with FIG. 1.

Some challenges may occur with depth sensors. For example, a consumer-level RGB-D sensor may be smaller than a commercial 3D scanner but may provide lower quality depth data. For example, holes may occur in depth data due to shadows, occlusions, and/or weak surface reflections. This may result in noisy depth data (e.g., depth images, depth maps, etc.). The noise in the depth data (e.g., missing depth pixels) may cause difficulties in accurately determining facial liveness. For example, it may be difficult to accurately and efficiently (e.g., quickly) determine facial liveness based on noisy depth data. Some configurations of the systems and methods disclosed herein may provide robust (e.g., accurate) and efficient facial liveness detection based on noisy depth data.

Figure 4:
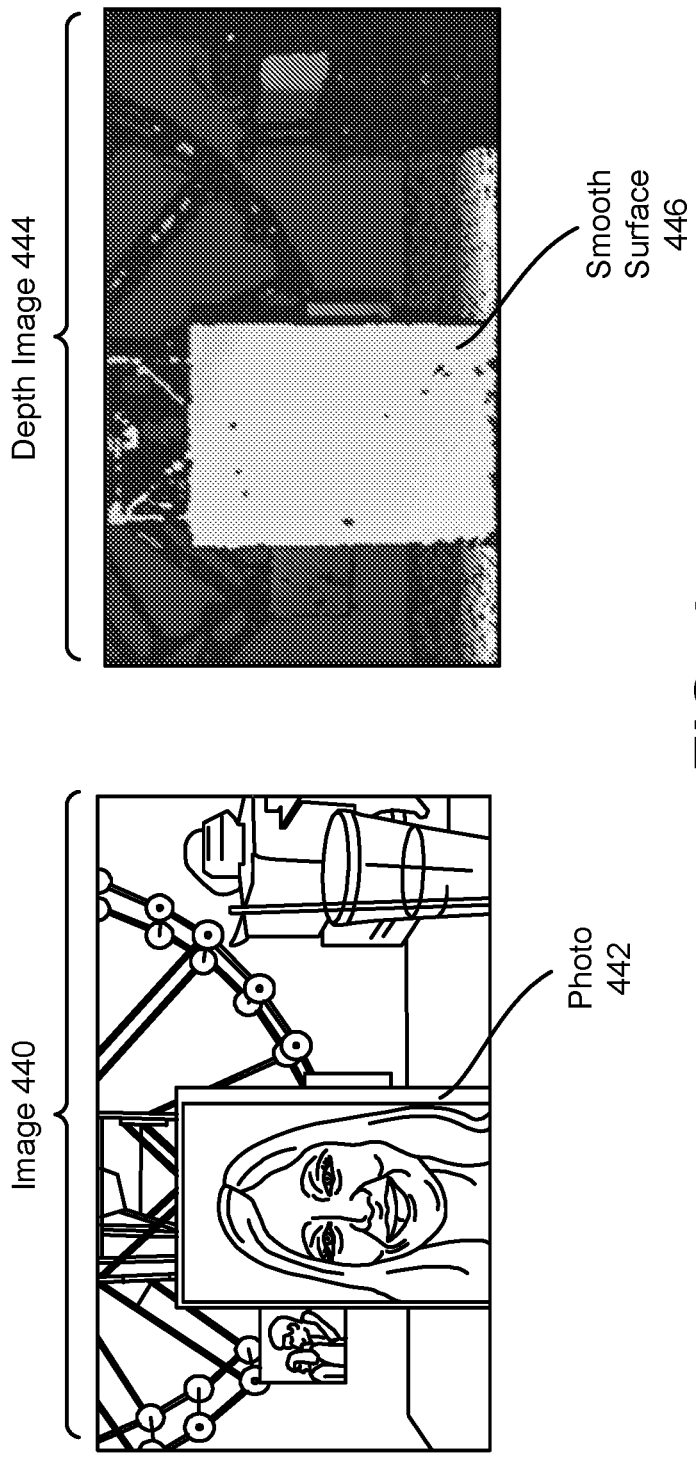
FIG. 4 is a diagram illustrating an example of an image and an example of a corresponding depth image.

FIG. 4 is a diagram illustrating an example of an image 440 and an example of a corresponding depth image 444. In particular, FIG. 4 illustrates robust face liveness detection with a combination of an image 440 (e.g., color image) and a depth image 444 from one or more sensors (e.g., an RGB-D sensor on a phone). In some configurations, an image 440 and a corresponding depth image 444 may be utilized to distinguish a live face (e.g., actual face, live face, etc.) from an artificial face (e.g., printed face).

As illustrated in FIG. 4, the image 440 may depict a face. In this example, the image 400 depicts an artificial face in a photo 442. For instance, a color image of a printed face may be produced for a spoofing attempt. The depth image 444 may be a depth image of a printed face. As can be observed in FIG. 4, the depth image 444 may indicate that the photo 442 has a smooth surface 446, indicating that the depicted face is not a live face.

FIG. 5 is a diagram illustrating examples of an image 548, an image with landmark detection 550, a depth image 554, and a depth image with landmark mapping 556. The image 548 may be an image of a live face. The depth image 554 may be a depth image of a live face, where the variation in the depth image 554 indicates depth variation. In particular, FIG. 5 illustrates an example of determining a set of landmarks 552 based on an image 548. For example, an electronic device (e.g., electronic device 102) may detect a set of landmarks 552 based on an image 548. The set of landmarks 552 may be mapped to a depth image 554 in order to determine a set of landmark depths 558 in accordance with some configurations of the systems and methods disclosed herein. In some approaches, fusion of an image (e.g., color image) and a depth image may be utilized to achieve robust liveness detection. For example, a red-green-blue (RGB) image may be utilized for face and/or landmark detection. The landmark locations may be mapped to the depth image. The depth image may be utilized to determine liveness (e.g., a liveness measure, smoothness measure, etc.).

Figure 6:
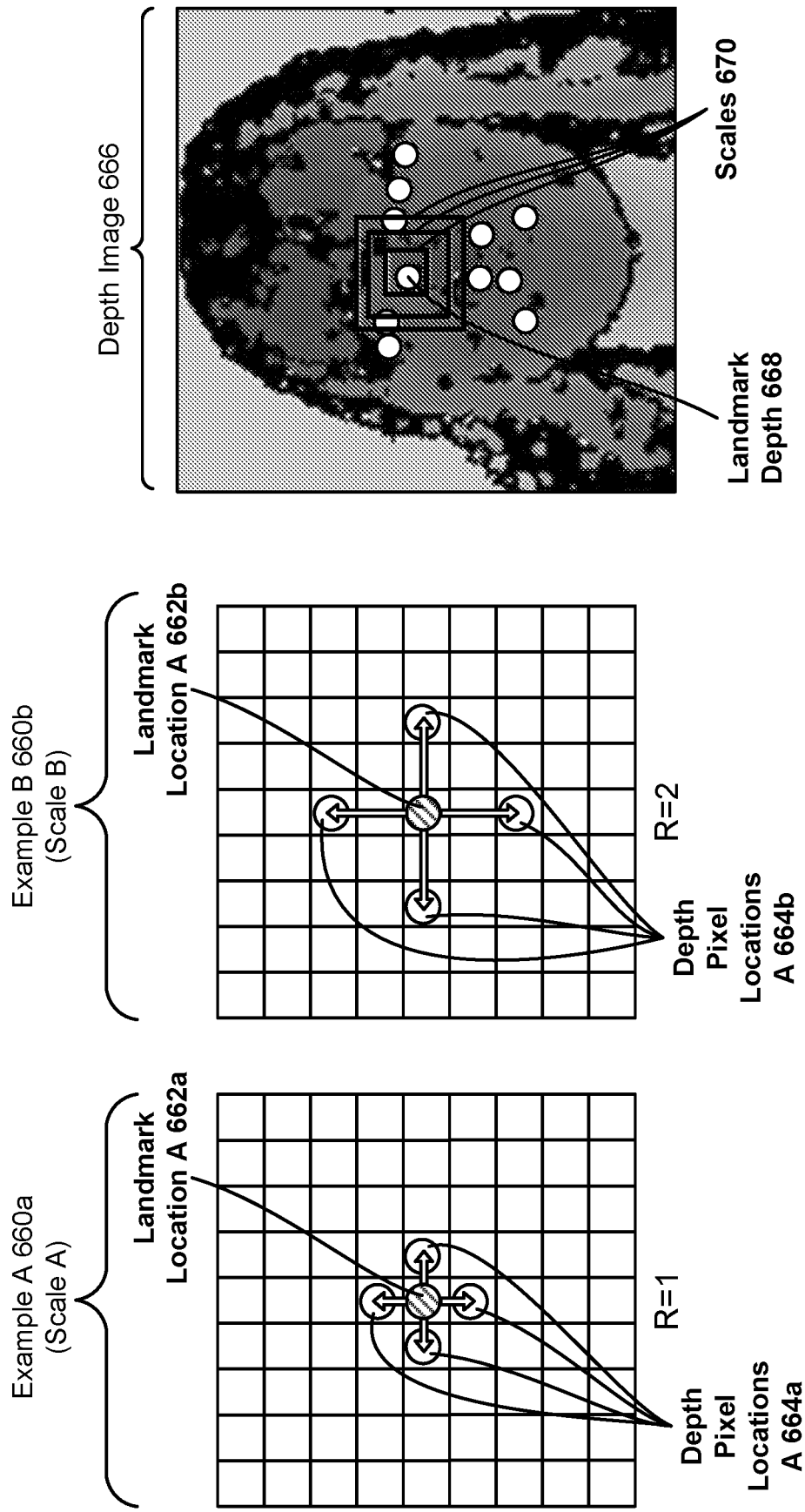
FIG. 6 is a diagram illustrating examples of scales and a depth image.

FIG. 6 is a diagram illustrating examples 660a-b of scales and a depth image 666. In particular, example A 660 a illustrates landmark location A 662a and depth pixel locations A 664a. Landmark location A 662a may be a location of a landmark depth and/or a location of a depth pixel within a patch relative to a landmark depth. Example A 660a shows a scale (e.g., radius) of one pixel (e.g., R=1) relative to landmark location A 662a. Example B 660b illustrates landmark location B 662b and depth pixel locations B 664b. Example B 660b shows a scale (e.g., radius) of two pixels (e.g., R=2) relative to landmark location B 662b. The depth image 666 also illustrates a landmark depth 668 and several scales 670. Depth pixels indicated by the scales 670 may be utilized to determine a smoothness measure.

For example, some configurations of the systems and methods disclosed herein may utilize a distance-adaptive multi-scale local smoothness measure on a depth image for determining liveness. For example, depth pixels indicated by the scales may be utilized in determining a smoothness measure. For instance, multi-scale Laplacian filtering may result in a smoothness measure on sparse landmark location regions. This approach may be relatively fast and robust to noisy depth data. Some configurations may utilize a Laplacian kernel (e.g., [0 −1 0; −1 4 −1; 0 −1 0]), which may reflect the smoothness of the local patch. Some approaches may utilize depth-adaptive (e.g., distance-adaptive) scale and/or depth-adaptive (e.g., distance-adaptive) liveness thresholding.

FIG. 7 is a diagram illustrating an example of face size determination and a natural face size criterion. In particular, FIG. 7 illustrates an image 772 of a face. An electronic device (e.g., electronic device 102) may determine a face size 774 represented by the perimeter of a quadrilateral. For example, an electronic device (e.g., electronic device 102) may measure distances between landmarks (e.g., outer eye landmarks and outer lip landmarks) to determine a measure (e.g., quadrilateral perimeter) of face size. It should be noted that although a quadrilateral perimeter is given as an example of face size, other measures may be utilized as face size.

An example of a natural face size criterion 778 is also illustrated in FIG. 7. In particular, a graph of face size versus depth 776 is given illustrating samples of face size over depth. Upper and/or lower boundaries of face sizes at certain distances may be determined based on statistics. The upper and/or lower boundaries (e.g., a range) may be utilized as a natural face size criterion. For example, if a measured face size 774 meets the natural face size criterion 778 (e.g., is within the range), then the face may be determined to be a natural size. A face size that does not meet the natural face size criterion may be determined to be (e.g., likely be) an artificial face.

Figure 8:
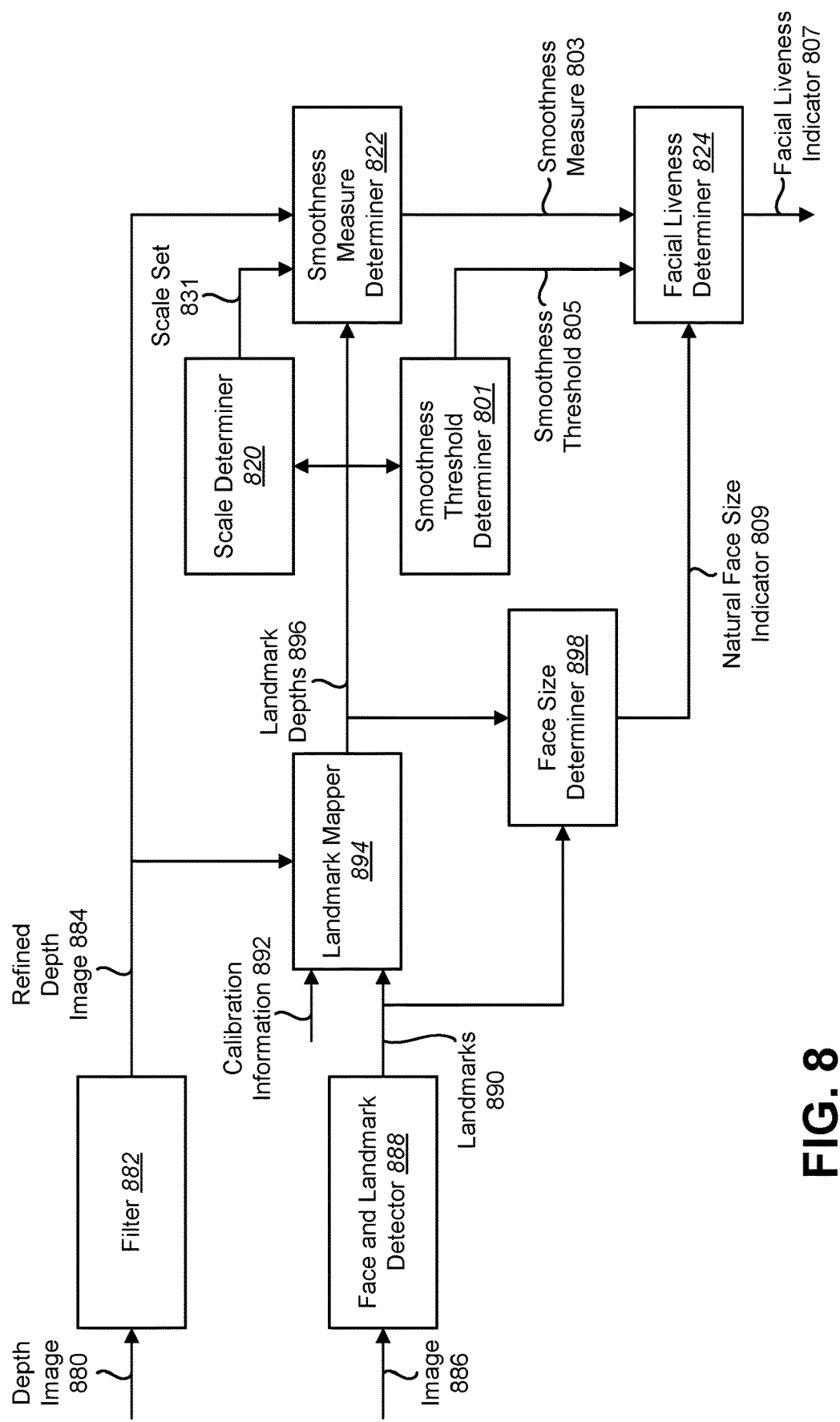
FIG. 8 is a block diagram illustrating an example of components and/or elements that may be implemented for facial liveness detection in accordance with some configurations of the systems and methods disclosed herein.

FIG. 8 is a block diagram illustrating an example of components and/or elements that may be implemented for facial liveness detection in accordance with some configurations of the systems and methods disclosed herein. One or more of the components and/or elements described in connection with FIG. 8 may be implemented in the electronic device 102 (e.g., processor 112) described in connection with FIG. 1. Additionally or alternatively, one or more of the functions described in connection with FIG. 8 may be performed by the electronic device 102 described in connection with FIG. 1. Additionally or alternatively, one or more of the functions described in connection with FIG. 1 may be performed by one or more of the components and/or elements described in connection with FIG. 8.

In the example of FIG. 8, a depth image 880 may be provided to a filter 882. The filter 882 may filter the depth image 880 to produce a refined depth image 884. For example, the filter 882 may reduce and/or remove noise from the depth image 880 to produce the refined depth image 884. In some approaches, no filter 882 may be utilized, and the depth image 880 may be used directly instead of the refined depth image 884. The refined depth image 884 may be provided to a landmark mapper 894 and to a smoothness measure determiner 822.

An image 886 (e.g., RGB image, black and white image, etc.) may be provided to a face and landmark detector 888. The face and landmark detector 888 may detect one or more faces and/or corresponding landmarks in the image 886. Landmarks 890 (e.g., landmark location indicators) may be provided to the landmark mapper 894 and/or to a face size determiner 898.

The landmark mapper 894 may utilize calibration information 892 and the landmarks 890 to determine landmark depths 896. For example, the landmark mapper 894 may map the landmarks 890 from the image 886 to corresponding locations in the refined depth image 884 to determine landmark depths 896. The landmark depths 896 may be provided to the face size determiner 898, to a scale determiner 820, to the smoothness measure determiner 822, and/or to a smoothness threshold determiner 801.

The face size determiner 898 may determine a face size based on the landmarks 890. For example, the face size determiner 898 may measure distances between landmarks 890 (e.g., a quadrilateral perimeter) to determine a face size. The face size determiner 898 may determine whether the face size meets a natural face size criterion. For example, the face size determiner 898 may determine whether the face size is within a natural face size range at a depth (based on one or more landmark depths 896, for instance). The face size determiner 898 may produce a natural face size indicator 809, which may be provided to a facial liveness determiner 824. The natural face size indicator 809 may indicate whether the face size meets the natural face size criterion (e.g., whether the face size is within the natural face size range at the corresponding depth).

The scale determiner 820 may determine one or more scales (e.g., a scale set 831) based on the landmark depths 896. For example, the scale determiner 820 may determine a scale set 831 for one or more landmarks based on the landmark depths 896. In some approaches, the scale determiner 820 may apply a function and/or look-up table to determine the scale set 831 (e.g., one or more scale sets 831) based on the landmark depths 896. The scale set 831 may be provided to the smoothness measure determiner 822.

The smoothness measure determiner 822 may determine a smoothness measure 803 based on the refined depth image 884 (or depth image 880), the scale set 831, and/or the landmark depths 896. For example, the smoothness measure determiner 822 may obtain (e.g., select) one or more sets of depth pixels based on the scale set 831 and the refined depth image 884. In particular, the scale set 831 may indicate the depth pixels in the refined depth image relative to the landmark depths 896. The smoothness measure determiner 822 may determine a smoothness measure 803 based on the depth pixels. For example, the smoothness measure determiner 822 may apply Laplacian filtering to the depth pixels to determine the smoothness measure 803. The smoothness measure 803 may be provided to the facial liveness determiner 824.

The smoothness threshold determiner 801 may determine a smoothness threshold 805 based on the landmark depths 896. For example, the smoothness threshold 805 may vary based on the landmark depths 896. In some approaches, the smoothness threshold determiner 801 may apply a function and/or look-up table to determine the smoothness threshold 805 based on the landmark depths 896. The smoothness threshold 805 may be provided to the facial liveness determiner 824.

The facial liveness determiner 824 may determine facial liveness based on the smoothness measure 803, the smoothness threshold 805, and/or the natural face size indicator 809. For example, if the natural face size indicator 809 indicates that the face size is not of a natural face size for the depth, the facial liveness determiner 824 may determine that the face is not a live face. The facial liveness determiner 824 may compare the smoothness measure 803 to the smoothness threshold 805. If the smoothness measure 803 satisfies (e.g., is less than) the smoothness threshold, and if the natural face size indicator 809 indicates that the face size is of a natural face size for the depth, the facial liveness determiner 824 may determine the that face is a live face. Otherwise, the facial liveness determiner 824 may determine that the face is an artificial face. The facial liveness determiner 824 may produce a facial liveness indicator 807 in some configurations. The facial liveness indicator 807 may indicate whether the face is determined to be a live face or an artificial face.

Figure 9:
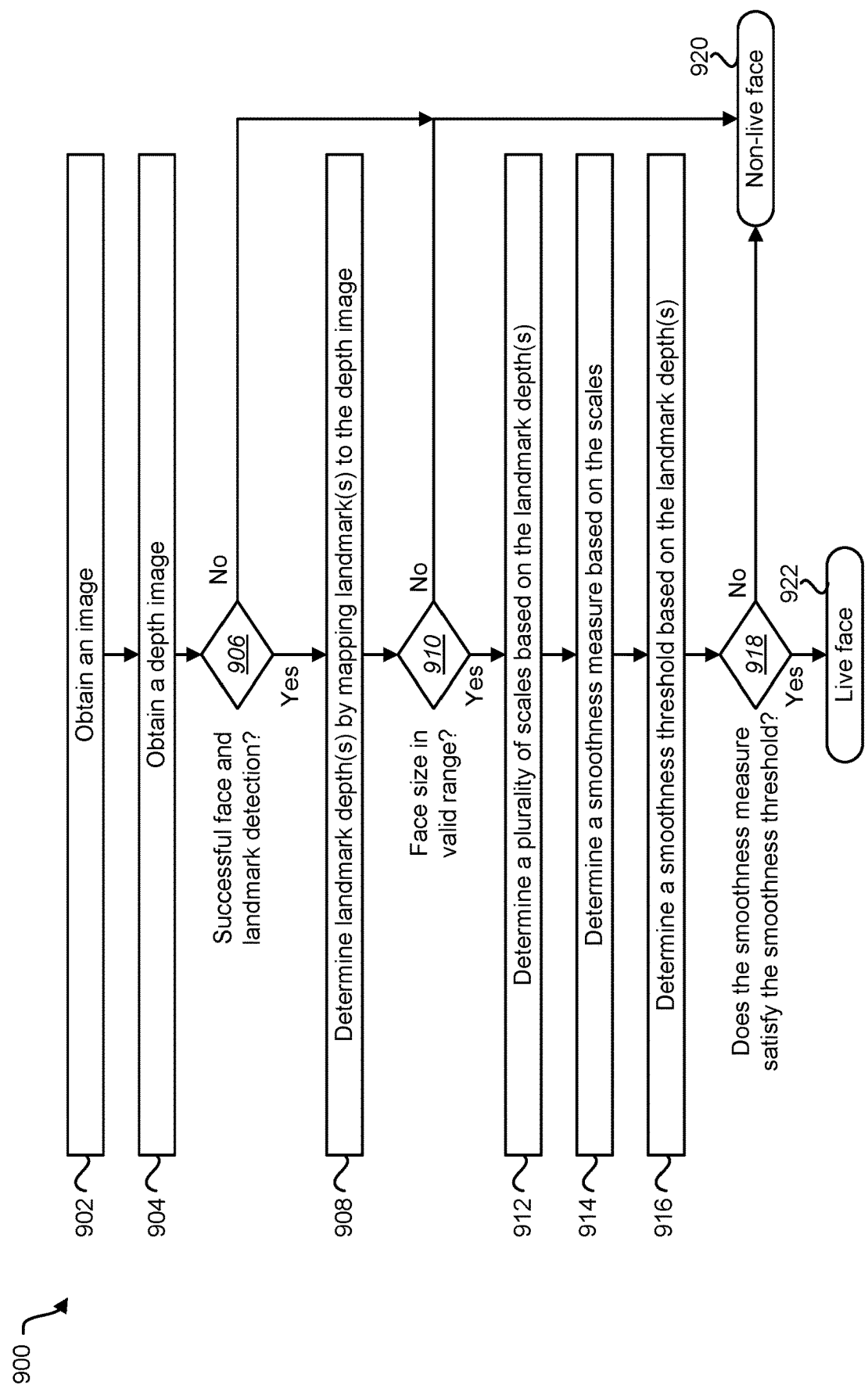
FIG. 9 is a flow diagram illustrating a more specific configuration of a method for facial liveness detection.

FIG. 9 is a flow diagram illustrating a more specific configuration of a method 900 for facial liveness detection. The method 900 may be performed by the electronic device 102 described in connection with FIG. 1 and/or by one or more of the components or elements described in connection with FIG. 8, for example.

The electronic device 102 may obtain 902 an image. This may be accomplished as described in connection with FIG. 1. For example, the electronic device 102 may capture the image with one or more image sensors. Additionally or alternatively, the electronic device 102 may request and/or receive the image from another device.

The electronic device 102 may obtain 904 a depth image. This may be accomplished as described in connection with FIG. 1. For example, the electronic device 102 may capture a depth image with one or more depth sensors. Additionally or alternatively, the electronic device 102 may request and/or receive the depth image from another device.

The electronic device 102 may determine 906 whether face and landmark detection is successful. For example, the electronic device 102 may perform face and/or landmark detection and may determine whether any face(s) and/or landmark(s) are detected. If no face and/or landmark is detected, the electronic device 102 may determine 906 that face and/or landmark detection was unsuccessful, which may end in a non-live face determination 920 (e.g., a determination that no live face is detected).

If face and/or landmark detection is successful, the electronic device 102 may determine 908 one or more landmark depths by mapping one or more landmarks to the depth image. This may be accomplished as described in connection with one or more of FIGS. 1, 5, and/or 8.

The electronic device 102 may determine 910 whether a face size is in a valid range. This may be accomplished as described in connection with one or more of FIGS. 1 and/or 7-8. If the face size is not within a valid range, operation may end in a non-live face determination 920 (e.g., a determination that no live face is detected).

If the face size is within a valid range, the electronic device 102 may determine 912 one or more scales (e.g., a plurality of scales) based on at least one landmark depth. This may be accomplished as described in connection with one or more of FIGS. 1-2 and/or 6.

The electronic device 102 may determine 914 a smoothness measure based on the scales. This may be accomplished as described in connection with one or more of FIGS. 1-2,6, and/or 8.

The electronic device 102 may determine 916 a smoothness threshold based on the landmark depth(s). This may be accomplished as described in connection with one or more of FIGS. 1 and/or 8.

The electronic device 102 may determine 918 whether the smoothness measure satisfies (e.g., is less than) the smoothness threshold. This may be accomplished as described in connection with one or more of FIGS. 1-2 and/or 8. If the smoothness threshold is not satisfied, operation may end in a non-live face determination 920 (e.g., a determination that no live face is detected). If the smoothness threshold is satisfied, operation may end in a live face determination 922 (e.g., a determination that a live face is detected).

In some configurations, the electronic device 102 may optionally authenticate based on the facial liveness determination. This may be accomplished as described in connection with one or more of FIGS. 1-2.

Figure 10:
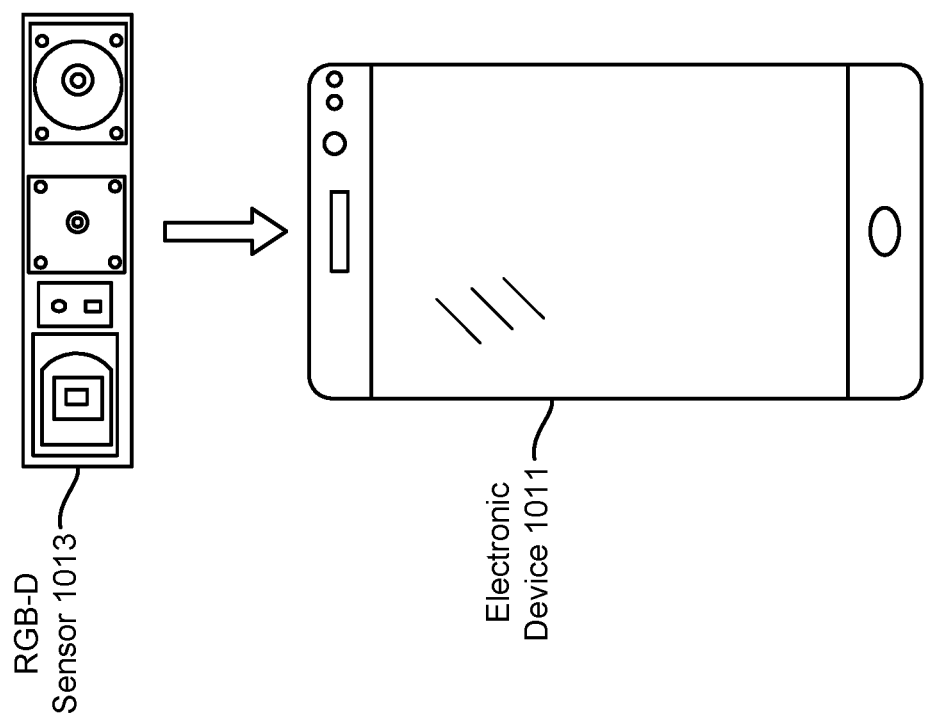
FIG. 10 illustrates an example of an electronic device in which systems and methods for facial liveness detection may be implemented.

FIG. 10 illustrates an example of an electronic device 1011 in which systems and methods for facial liveness detection may be implemented. In particular, FIG. 10 illustrates an example of integrating an RGB-D sensor 1013 in a phone. For example, RGB-D sensors may become cheap enough and/or small enough in size to even fit into a mobile phone.

The RGB-D sensor 1013 may provide both a color image and a depth image of a face, which may be beneficial to liveness detection. The depth image, or 3D surface, of a live face may be distinguishable from that of forged faces printed or displayed on planar materials. An example of an image and depth image of an artificial (e.g., forged printed, etc.) face is given in connection with FIG. 4. An example of an image and depth image of a live face is given in connection with FIG. 5. FIGS. 4 and 5 illustrate a difference between depth images of a printed face versus a true face captured by an RGB-D sensor.

Compared with commercial 3D scanners, depth images obtained by consumer-level RGB-D sensors may have much lower quality. For example, there can be "holes" in the depth image caused by shadow, weak reflection, or occlusions. Additionally or alternatively, the depth image may be noisy.

Figure 11:
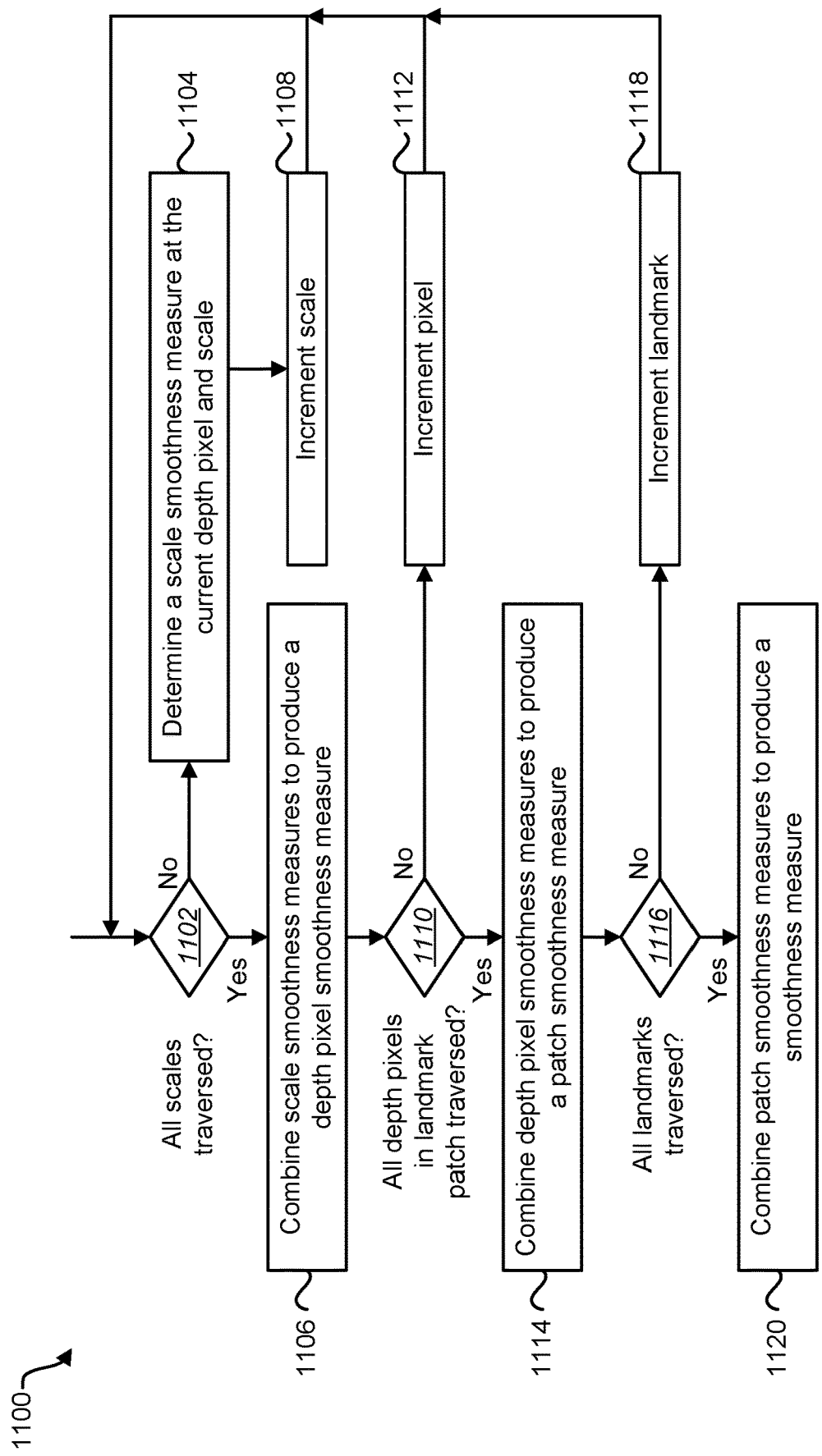
FIG. 11 is a flow diagram illustrating one configuration of a method for determining a smoothness measure based on the scales of the depth image pixels.

FIG. 11 is a flow diagram illustrating one configuration of a method 1100 for determining a smoothness measure based on the scales of the depth image pixels. The method 1100 may be performed by one or more of the electronic devices 102, 1011 described in connection with FIG. 1 and/or FIG. 10 (and/or by one or more of the smoothness measure determiners 122, 822 described in connection with FIG. 1 and/or FIG. 8). In particular, the method 1100 may be performed based on a set of scales and depth image pixels for one or more landmarks. For example, the method 1100 may start with a first depth pixel of a first patch of a first landmark of depth image and may iterate to the last depth pixel of a last patch of a last landmark of the depth image.

The electronic device 102 may determine 1102 whether all scales in a set of scales have been traversed. For example, a set of scales may have been determined based on a depth of a face as described herein. The electronic device 102 may determine whether a scale smoothness measure (e.g., a combined smoothness measure) for each scale of a depth pixel has been determined.

If not all scales have been traversed, the electronic device 102 may determine 1104 a scale smoothness measure at the current depth pixel and scale. For example, the electronic device 102 may perform Laplacian filtering in accordance with Equation (4) to determine the scale smoothness measure. For instance, the electronic device 102 may apply a Laplacian kernel to the depth pixels relative to the current depth pixel (e.g., $(x_0, y_0)$) according to the current scale (e.g., r) to produce the scale smoothness measure (e.g., $LD_r(x_0, y_0)$). The electronic device 102 may increment 1108 the scale (if there are any remaining scales, for example). For example, the electronic device 102 may increment processing to a next scale in the set of scales.

If all scales have been traversed (e.g., if a scale smoothness measure has been determined for each scale in the set of scales for the current depth pixel), the electronic device 102 may combine 1106 (e.g., average, add, etc.) the scale smoothness measures to produce a depth pixel smoothness measure (e.g., a smoothness measure corresponding to the current depth pixel).

The electronic device 102 may determine 1110 whether all depth pixels in a landmark patch have been traversed. For example, a landmark patch may be centered on a landmark pixel. The electronic device 102 may determine whether a depth pixel smoothness measure for each depth pixel in the landmark patch has been determined.

If not all depth pixels have been traversed, the electronic device 102 may increment 1112 the depth pixel. For example, the electronic device 102 may increment processing to a next depth pixel in the landmark patch.

If all depth pixels in the landmark patch have been traversed (e.g., if a depth pixel smoothness measure has been determined for each depth pixel in the current landmark patch), the electronic device 102 may combine 1114 (e.g., average, add, etc.) the depth pixel smoothness measures to produce a patch smoothness measure (e.g., a smoothness measure corresponding to the current landmark patch).

The electronic device 102 may determine 1116 whether all landmarks in a depth image (and/or all landmarks corresponding to one face) have been traversed. For example, the electronic device 102 may determine whether a patch smoothness measure for each landmark in the depth image has been determined.

If not all landmarks have been traversed, the electronic device 102 may increment 1118 the landmark. For example, the electronic device 102 may increment processing to a next landmark in the depth image (e.g., corresponding to a face).

If all landmarks have been traversed (e.g., if a patch smoothness measure has been determined for each landmark), the electronic device 102 may combine 1120 (e.g., average, add, etc.) the patch smoothness measures to produce a smoothness measure (e.g., overall smoothness measure, face smoothness measure, final smoothness measure, etc.). As described herein, the smoothness measure may be utilized to determine facial liveness in some configurations.

Figure 12:
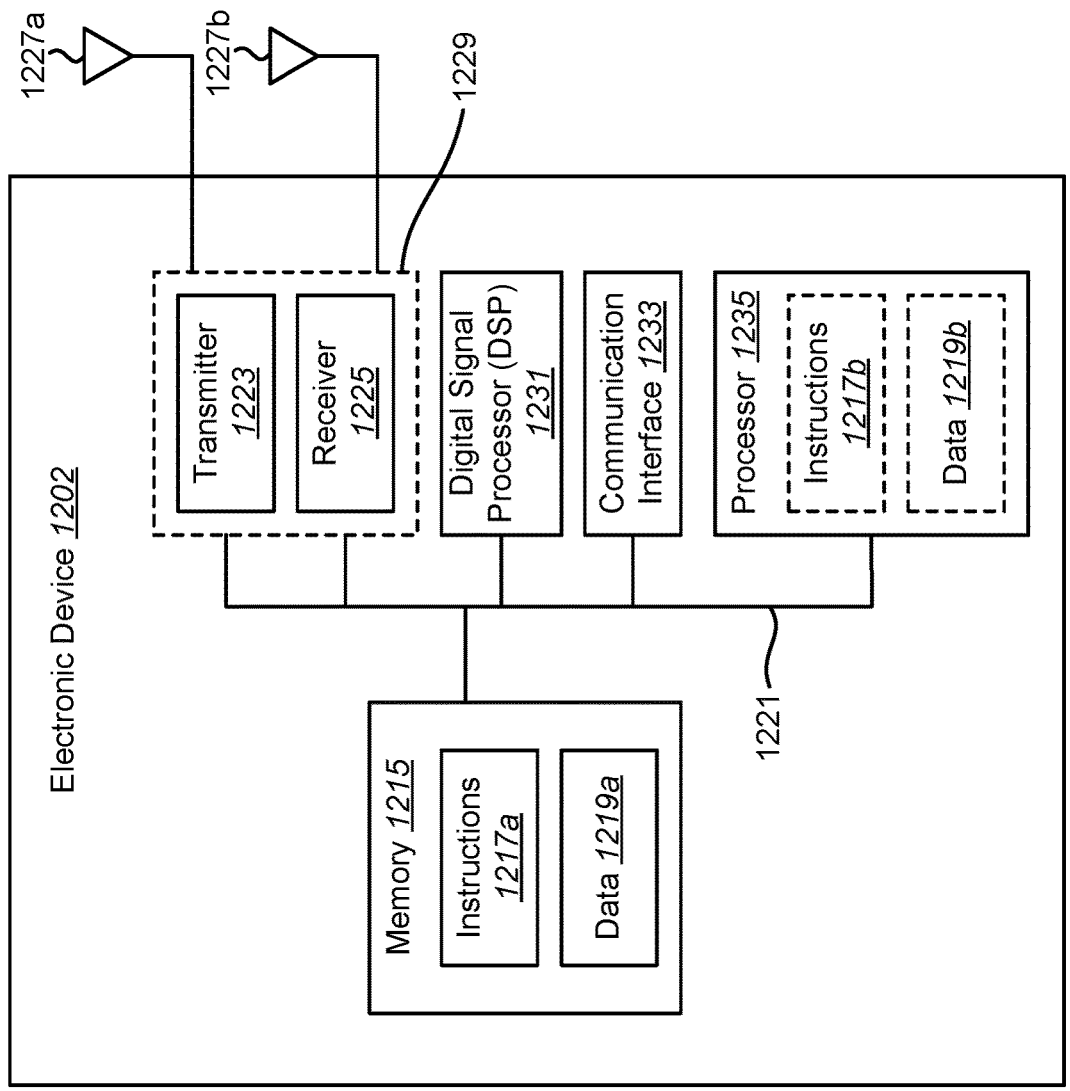
FIG. 12 illustrates certain components that may be included within an electronic device.

FIG. 12 illustrates certain components that may be included within an electronic device 1202. The electronic device 1202 may be an example of and/or may be implemented in accordance with one or more of the electronic devices 102, 1011 described in connection with one or more of FIG. 1 and/or FIG. 10 and/or in accordance with one or more of the components or elements described in connection with FIG. 8. The electronic device 1202 may be (or may be included within) a camera, video camcorder, digital camera, cellular phone, smart phone, computer (e.g., desktop computer, laptop computer, etc.), tablet device, media player, television, vehicle, automobile, personal camera, action camera, surveillance camera, mounted camera, connected camera, robot, aircraft, drone, unmanned aerial vehicle (UAV), healthcare equipment, gaming console, personal digital assistant (PDA), set-top box, electro-mechanical device, etc.

The electronic device 1202 includes a processor 1235. The processor 1235 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 1235 may be referred to as a central processing unit (CPU). Although just a single processor 1235 is shown in the electronic device 1202, in an alternative configuration, a combination of processors (e.g., an ARM and DSP) could be used.

The electronic device 1202 also includes memory 1215. The memory 1215 may be any electronic component capable of storing electronic information. The memory 1215 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data 1219a and instructions 1217a may be stored in the memory 1215. The instructions 1217a may be executable by the processor 1235 to implement one or more of the methods 200, 900, 1100 described herein. Executing the instructions 1217a may involve the use of the data 1219a that is stored in the memory 1215. When the processor 1235 executes the instructions 1217, various portions of the instructions 1217b may be loaded onto the processor 1235, and various pieces of data 1219b may be loaded onto the processor 1235.

The electronic device 1202 may also include a transmitter 1223 and a receiver 1225 to allow transmission and reception of signals to and from the electronic device 1202. The transmitter 1223 and receiver 1225 may be collectively referred to as a transceiver 1229. One or multiple antennas 1227a-b may be electrically coupled to the transceiver 1229. The electronic device 1202 may also include (not shown) multiple transmitters, multiple receivers, multiple transceivers, and/or additional antennas.

The electronic device 1202 may include a digital signal processor (DSP) 1231. The electronic device 1202 may also include a communication interface 1233. The communication interface 1233 may enable one or more kinds of input and/or output. For example, the communication interface 1233 may include one or more ports and/or communication devices for linking other devices to the electronic device 1202. Additionally or alternatively, the communication interface 1233 may include one or more other interfaces (e.g., touchscreen, keypad, keyboard, microphone, camera, etc.). For example, the communication interface 1233 may enable a user to interact with the electronic device 1202.

The various components of the electronic device 1202 may be coupled together by one or more buses, which may include a power bus, a control signal bus, a status signal bus, a data bus, etc. For the sake of clarity, the various buses are illustrated in FIG. 12 as a bus system 1221.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refer to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
   receiving an image, wherein the image depicts a face;
   detecting at least one facial landmark of the face in the image;
   receiving a depth image of the face;
   determining at least one landmark depth by mapping the at least one facial landmark to the depth image;

determining a plurality of scales of depth image pixels based on the at least one landmark depth;
determining a scale smoothness measure for each of the plurality of scales of depth image pixels; and
determining facial liveness based on at least two of the scale smoothness measures.

2. The method of claim 1, wherein determining the plurality of scales is based on an inverse relationship between the at least one landmark depth and the plurality of scales.

3. The method of claim 1, wherein determining the scale smoothness measures comprises applying Laplacian filtering for each of the plurality of scales of the depth image pixels.

4. The method of claim 1, further comprising determining a smoothness measure based on at least two of the scale smoothness measures, wherein determining the facial liveness comprises comparing the smoothness measure to a smoothness threshold.

5. The method of claim 4, further comprising adapting the smoothness threshold based on the at least one landmark depth in accordance with a direct relationship.

6. The method of claim 1, further comprising determining whether a size of the face meets a natural face size criterion.

7. The method of claim 6, wherein determining whether the size of the face meets the natural face size criterion comprises determining whether the size of the face at a depth indicated by the depth image is within a natural face size range.

8. The method of claim 6, wherein determining the facial liveness is further based on the determination of whether the size of the face meets the natural face size criterion.

9. The method of claim 1, further comprising performing authentication based on the facial liveness determination.

10. The method of claim 1, wherein determining the scale smoothness measures comprises applying a Laplacian kernel for each of the plurality of scales for each depth pixel within a landmark patch for each of the at least one landmark depth.

11. An electronic device, comprising:
a memory;
a processor coupled to the memory, wherein the processor is configured to:
receive an image, wherein the image depicts a face;
detect at least one facial landmark of the face in the image;
receive a depth image of the face;
determine at least one landmark depth by mapping the at least one facial landmark to the depth image;
determine a plurality of scales of depth image pixels based on the at least one landmark depth;
determine a scale smoothness measure for each of the plurality of scales of depth image pixels; and
determine facial liveness based on at least two of the scale smoothness measures.

12. The electronic device of claim 11, wherein the processor is configured to determine the plurality of scales based on an inverse relationship between the at least one landmark depth and the plurality of scales.

13. The electronic device of claim 11, wherein the processor is configured to determine the scale smoothness measures by applying Laplacian filtering for each of the plurality of scales of the depth image pixels.

14. The electronic device of claim 11, wherein the processor is configured to:
determine a smoothness measure based on at least two of the scale smoothness measures; and
determine the facial liveness by comparing the smoothness measure to a smoothness threshold.

15. The electronic device of claim 14, wherein the processor is configured to adapt the smoothness threshold based on the at least one landmark depth in accordance with a direct relationship.

16. The electronic device of claim 11, wherein the processor is configured to determine whether a size of the face meets a natural face size criterion.

17. The electronic device of claim 16, wherein the processor is configured to determine whether the size of the face meets the natural face size criterion by determining whether the size of the face at a depth indicated by the depth image is within a natural face size range.

18. The electronic device of claim 16, wherein the processor is configured to determine the facial liveness further based on the determination of whether the size of the face meets the natural face size criterion.

19. The electronic device of claim 11, the processor is configured to perform authentication based on the facial liveness determination.

20. The electronic device of claim 11, wherein the processor is configured to determine the scale smoothness measures by applying a Laplacian kernel for each of the plurality of scales for each depth pixel within a landmark patch for each of the at least one landmark depth.

21. A non-transitory tangible computer-readable medium storing computer executable code, comprising:
code for causing an electronic device to receive an image, wherein the image depicts a face;
code for causing the electronic device to detect at least one facial landmark of the face in the image;
code for causing the electronic device to receive a depth image of the face;
code for causing the electronic device to determine at least one landmark depth by mapping the at least one facial landmark to the depth image;
code for causing the electronic device to determine a plurality of scales of depth image pixels based on the at least one landmark depth;
code for causing the electronic device to determine a scale smoothness measure for each of the plurality of scales of depth image pixels; and
code for causing the electronic device to determine facial liveness based on at least two of the scale smoothness measures.

22. The computer-readable medium of claim 21, wherein the code for causing the electronic device to determine the plurality of scales is based on an inverse relationship between the at least one landmark depth and the plurality of scales.

23. The computer-readable medium of claim 21, wherein the code for causing the electronic device to determine the scale smoothness measures comprises code for causing the electronic device to apply Laplacian filtering for each of the plurality of scales of the depth image pixels.

24. The computer-readable medium of claim 21, further comprising code for causing the electronic device to determine a smoothness measure based on at least two of the scale smoothness measures, wherein the code for causing the electronic device to determine the facial liveness comprises code for causing the electronic device to compare the smoothness measure to a smoothness threshold.

25. The computer-readable medium of claim 21, further comprising code for causing the electronic device to determine whether a size of the face meets a natural face size criterion.

26. An apparatus, comprising:
- means for receiving an image, wherein the image depicts a face;
- means for detecting at least one facial landmark of the face in the image;
- means for receiving a depth image of the face;
- means for determining at least one landmark depth by mapping the at least one facial landmark to the depth image;
- means for determining a plurality of scales of depth image pixels based on the at least one landmark depth;
- means for determining a scale smoothness measure for each of the plurality of scales of depth image pixels; and
- means for determining facial liveness based on at least two of the scale smoothness measures.

27. The apparatus of claim 26, wherein the means for determining the plurality of scales is based on an inverse relationship between the at least one landmark depth and the plurality of scales.

28. The apparatus of claim 26, wherein the means for determining the scale smoothness measures comprises means for applying Laplacian filtering for each of the plurality of scales of the depth image pixels.

29. The apparatus of claim 26, further comprising means for determining a smoothness measure based on at least two of the scale smoothness measures, wherein the means for determining the facial liveness comprises means for comparing the smoothness measure to a smoothness threshold.

30. The apparatus of claim 26, further comprising means for determining whether a size of the face meets a natural face size criterion.

* * * * *